(12) United States Patent
Fok et al.

(10) Patent No.: US 12,499,174 B2
(45) Date of Patent: Dec. 16, 2025

(54) METHODS AND APPARATUS FOR MATRIX AND VECTOR STORAGE AND OPERATIONS

(71) Applicant: Femtosense, Inc., Palo Alto, CA (US)

(72) Inventors: Sam Brian Fok, San Leandro, CA (US); Alexander Smith Neckar, Redwood City, CA (US); Manish Shrivastava, Pleasanton, CA (US)

(73) Assignee: Femtosense, Inc., Palo Alto, CA (US)

( * ) Notice: Subject to any disclaimer, the term of this patent is extended or adjusted under 35 U.S.C. 154(b) by 1087 days.

(21) Appl. No.: 17/367,517

(22) Filed: Jul. 5, 2021

(65) Prior Publication Data
US 2022/0012598 A1  Jan. 13, 2022

Related U.S. Application Data

(60) Provisional application No. 63/050,090, filed on Jul. 9, 2020.

(51) Int. Cl.
*G06F 17/16* (2006.01)
*G06F 9/30* (2018.01)
(Continued)

(52) U.S. Cl.
CPC .......... *G06F 17/16* (2013.01); *G06F 9/30036* (2013.01); *G06F 9/3802* (2013.01); *G06F 9/3818* (2013.01); *G06F 9/3836* (2013.01); *G06F 9/3838* (2013.01); *G06F 9/3851* (2013.01); *G06F 9/3885* (2013.01); *G06F 9/48* (2013.01); *G06F 11/3024* (2013.01); *G06F 11/3433* (2013.01); *G06F 15/16* (2013.01); *G06F 15/7807* (2013.01); *G06F 16/901* (2019.01); *G06N 3/045* (2023.01); *G06N 3/048* (2023.01); *G06N 3/063* (2013.01); *G06N 3/10* (2013.01); *G06N 3/098* (2023.01)

(58) Field of Classification Search
CPC ....................................................... G06F 17/16
See application file for complete search history.

(56) References Cited

U.S. PATENT DOCUMENTS 10,452,744 B2 * 10/2019 Agrawal ................. G06F 17/16
10,965,315 B2    3/2021 Kamal
(Continued)

OTHER PUBLICATIONS

Definition of "decompress" in Cambridge Dictionary, Jun. 24, 2016, https://web.archive.org/web/20160624170745/https://dictionary.cambridge.org/us/dictionary/english/decompress (Year: 2016).*

*Primary Examiner* — Carlo Waje
(74) *Attorney, Agent, or Firm* — Wang Hardoon, P.C.

(57) ABSTRACT

Methods and apparatus for matrix and vector storage and operations are disclosed. Exemplary embodiments include a multicore processor, where each core includes processing hardware, local weights, global weights, working memory, and accumulator. Exemplary embodiments compress sparse neural network data structures based on actual, non-null, connectivity (rather than all possible connections). In some variants, the compression and reduction in complexity is sized to fit within the memory footprint and processing capabilities of a core. The exemplary compression schemes represent sparse matrices with links to compressed column data structures, where each compressed column data structure only stores non-null entries to optimize column-based lookups of non-null entries. Similarly, sparse vector addressing skips nulled entries when performing vector-specific non-null multiply-accumulate operations.

19 Claims, 12 Drawing Sheets

(51) Int. Cl.
*G06F 9/38* (2018.01)
*G06F 9/48* (2006.01)
*G06F 11/30* (2006.01)
*G06F 11/34* (2006.01)
*G06F 15/16* (2006.01)
*G06F 15/78* (2006.01)
*G06F 16/901* (2019.01)
*G06N 3/045* (2023.01)
*G06N 3/048* (2023.01)
*G06N 3/063* (2023.01)
*G06N 3/10* (2006.01)
*G06N 3/098* (2023.01)

(56) References Cited

U.S. PATENT DOCUMENTS

| | | | |
|---|---|---|---|
| 11,599,181 B1 | 3/2023 | Nair et al. | |
| 11,625,592 B2 | 4/2023 | Fok et al. | |
| 11,748,666 B2 | 9/2023 | Feng et al. | |
| 12,136,039 B1 | 11/2024 | Sather et al. | |
| 2007/0220517 A1 | 9/2007 | Lippett | |
| 2007/0283357 A1 | 12/2007 | Jeter et al. | |
| 2014/0306970 A1 | 10/2014 | Surti et al. | |
| 2014/0331029 A1 | 11/2014 | Foo | |
| 2015/0379668 A1 | 12/2015 | Weissmann et al. | |
| 2017/0024645 A1 | 1/2017 | Socher et al. | |
| 2018/0113713 A1 | 4/2018 | Cheng et al. | |
| 2018/0189234 A1* | 7/2018 | Nurvitadhi | G06F 17/16 |
| 2019/0349318 A1 | 11/2019 | Fok et al. | |
| 2019/0379396 A1* | 12/2019 | Bajic | G06F 17/16 |
| 2020/0019837 A1 | 1/2020 | Boahen et al. | |
| 2020/0135095 A1* | 4/2020 | Mobasher | H03M 7/70 |
| 2020/0293367 A1 | 9/2020 | Andrei et al. | |
| 2021/0200610 A1* | 7/2021 | Chu | H04L 69/04 |
| 2021/0209450 A1 | 7/2021 | Cassidy et al. | |
| 2021/0397943 A1* | 12/2021 | Ribalta | G06N 3/08 |
| 2022/0012060 A1 | 1/2022 | Fok et al. | |
| 2022/0012575 A1 | 1/2022 | Fok et al. | |
| 2022/0012598 A1 | 1/2022 | Fok et al. | |
| 2023/0133088 A1 | 5/2023 | Fok et al. | |

* cited by examiner

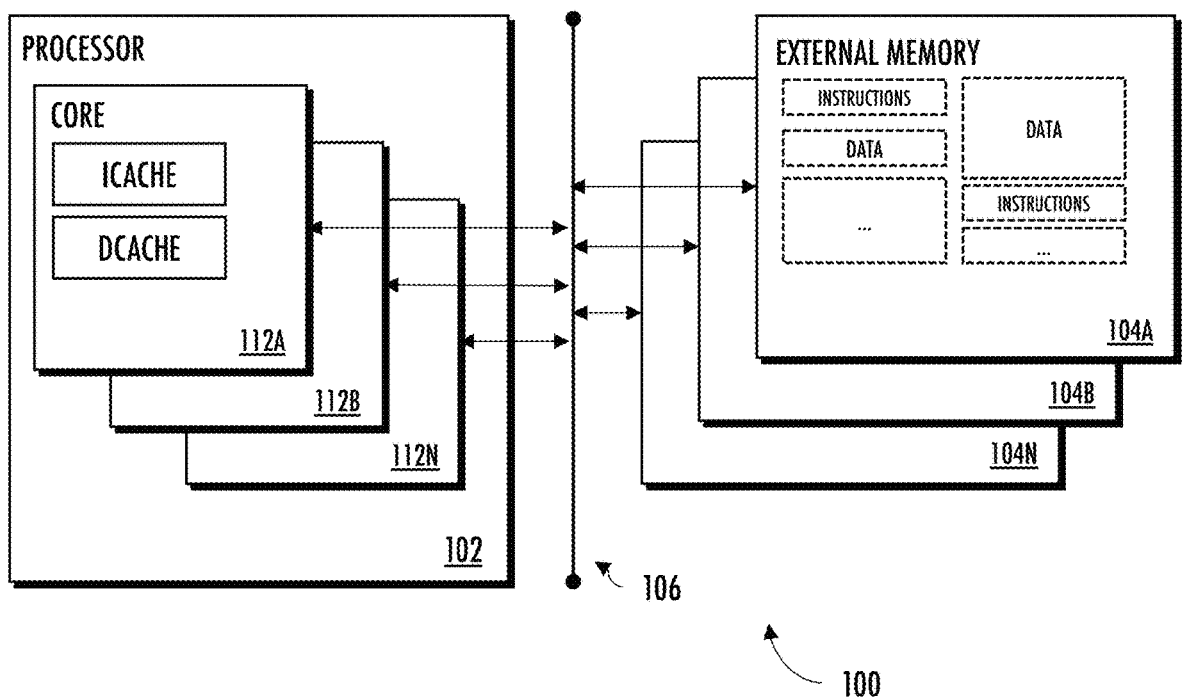
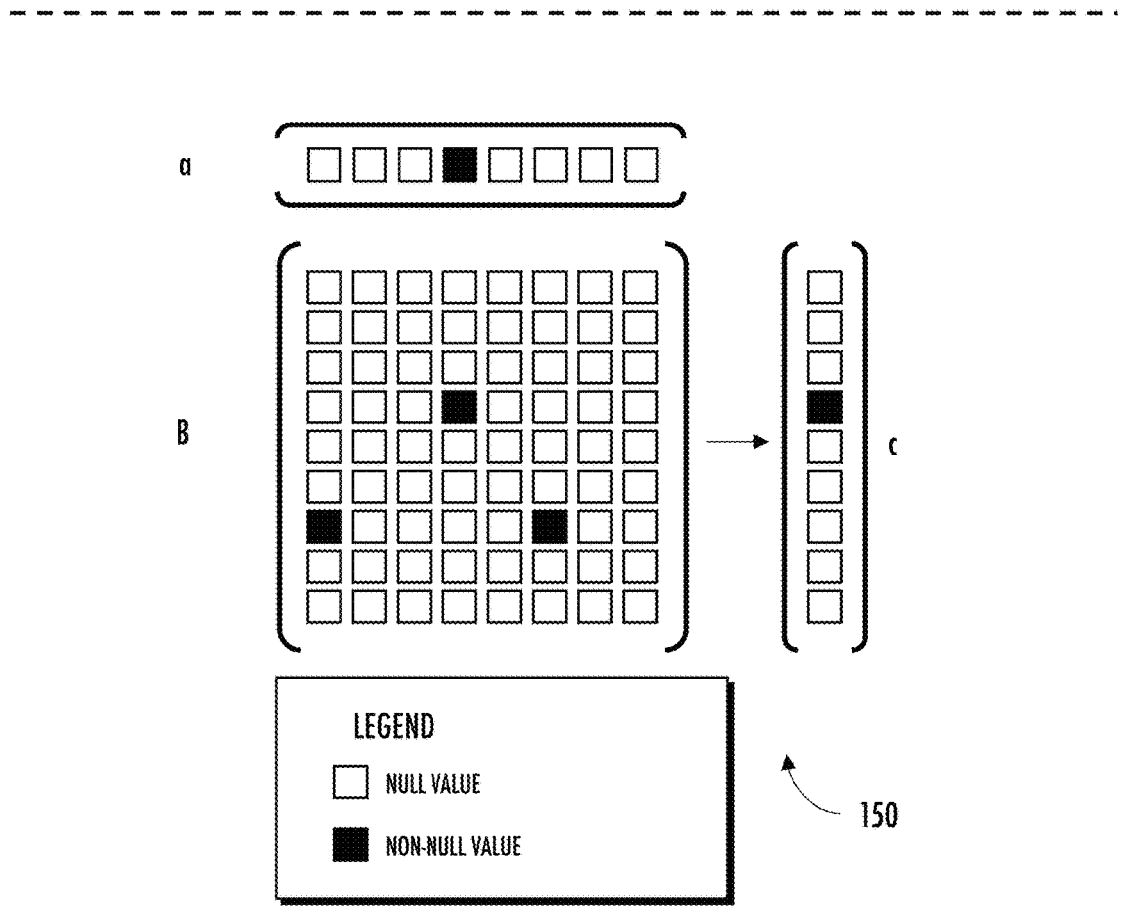
FIG. 1

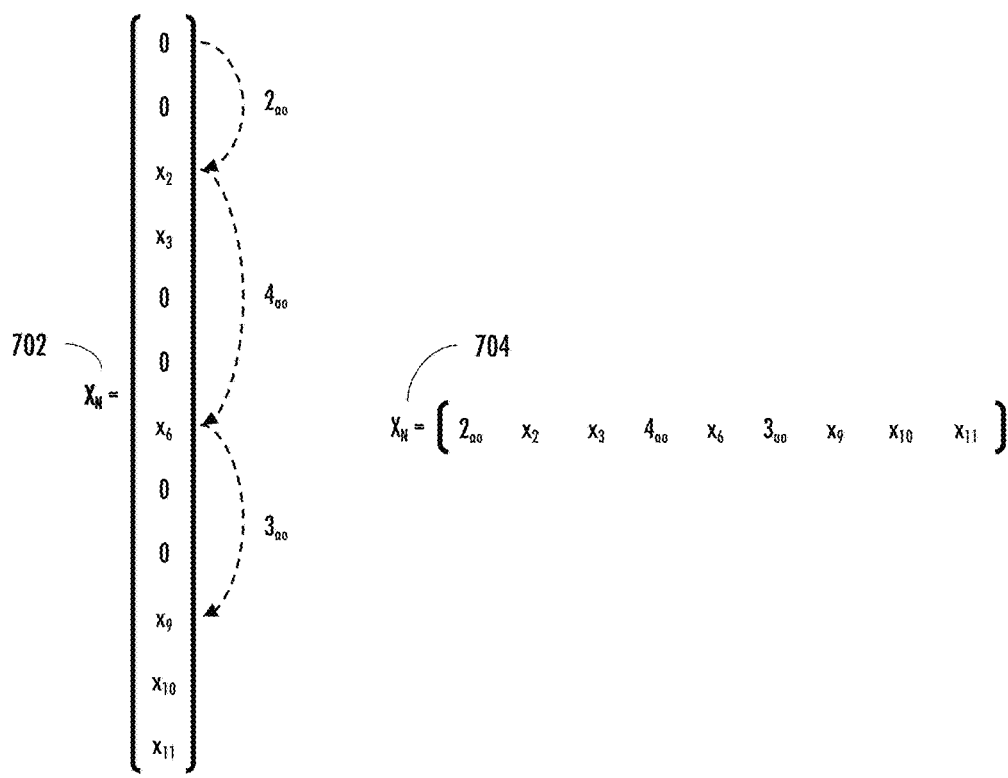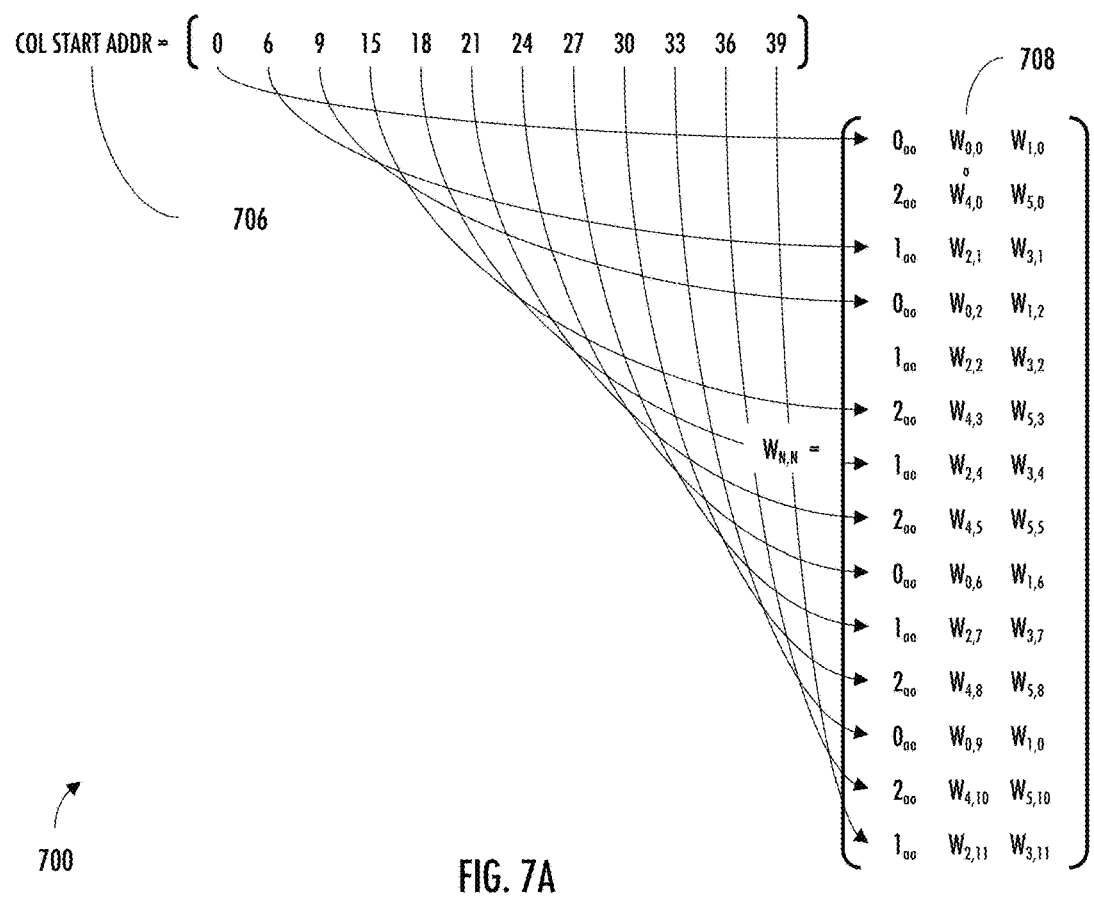
FIG. 7A $$W_{N,N} = \begin{bmatrix} W_{0,0} & 0 & W_{0,2} & 0 & 0 & 0 & W_{0,6} & 0 & 0 & W_{0,9} & 0 & 0 \\ W_{1,0} & 0 & W_{1,2} & 0 & 0 & 0 & W_{1,6} & 0 & 0 & W_{1,9} & 0 & 0 \\ 0 & W_{2,1} & W_{2,2} & 0 & W_{2,4} & 0 & 0 & W_{2,7} & 0 & 0 & 0 & W_{2,11} \\ 0 & W_{3,1} & W_{3,2} & 0 & W_{3,4} & 0 & 0 & W_{3,7} & 0 & 0 & 0 & W_{3,11} \\ W_{4,0} & 0 & 0 & W_{4,3} & 0 & W_{4,5} & 0 & 0 & W_{4,8} & 0 & W_{4,10} & 0 \\ W_{5,0} & 0 & 0 & W_{5,3} & 0 & W_{5,5} & 0 & 0 & W_{5,8} & 0 & W_{5,10} & 0 \end{bmatrix}$$

710

$$W_{N,N} = \begin{bmatrix} 0_{oo} & 1_{oo} & 0_{oo} & 2_{oo} & 1_{oo} & 2_{oo} & 0_{oo} & 1_{oo} & 2_{oo} & 0_{oo} & 2_{oo} & 1_{oo} \\ W_{0,0} & W_{2,1} & W_{0,2} & W_{4,3} & W_{2,4} & W_{4,5} & W0_{,6} & W_{2,7} & W_{4,8} & W_{0,9} & W_{4,10} & W_{2,11} \\ W_{1,0} & W_{3,1} & W_{1,2} & W_{5,3} & W_{3,4} & W_{5,5} & W_{1,6} & W_{3,7} & W_{5,8} & W_{1,9} & W_{5,10} & W_{3,11} \\ 2_{oo} & & 1_{oo} & & & & & & & & & \\ W_{4,0} & & W_{2,2} & & & & & & & & & \\ W_{5,0} & & W_{3,2} & & & & & & & & & \end{bmatrix}$$

712

- - - - - - - - - - - - - - - - - - - - - - - - - - - - - - - - - - - - - - - -

714

$Y_0 = \quad x_2 \times W_{0,2} \; + \qquad\qquad x_6 \times W_{0,6} \; + \quad x_9 \times W_{0,9}$ $Y_1 = \quad x_2 \times W_{1,2} \; + \qquad\qquad x_6 \times W_{1,6} \; + \quad x_9 \times W_{1,9}$ $Y_2 = \quad x_2 \times W_{2,2} \; + \qquad\qquad\qquad\qquad\qquad\qquad + \; x_{11} \times W_{2,11}$ $Y_3 = \quad x_2 \times W_{3,2} \; + \qquad\qquad\qquad\qquad\qquad\qquad + \; x_{11} \times W_{3,11}$ $Y_4 = \qquad\qquad\qquad x_3 \times W_{4,3} \; + \qquad\qquad\qquad + \; x_{10} \times W_{4,10}$ $Y_5 = \qquad\qquad\qquad x_3 \times W_{5,3} \; + \qquad\qquad\qquad + \; x_{10} \times W_{5,10}$

716

$$Y_{1,N} = \begin{bmatrix} Y_0 \\ Y_1 \\ Y_2 \\ Y_3 \\ Y_4 \\ Y_5 \end{bmatrix}$$

```
WVPROD(len=len_out i2=addr_i, i1=len_in, i0=addr_w)
#Description: Perform a dense-dense matrix-vector product and add it to the accumulator
#Parameters:
#       len_out: output vector length/height of the matrix
#       addr_i: data memory address of the vector
#       len_in: input vector length/width of the matrix
#       addr_w: data memory address of the matrix
#The input vector and matrix may be located in different data memory banks.
#Math:
#       acc := acc + W * x
#       for (accumulator) vector acc, matrix W, and vector x
#       acc will be clipped to precision-bits after the operation
#Pseudocode:
# compute the matrix-vector product column-by-column
for i in [0, len_in):
        x = M[addr_i + i]
        acc[0 : len_out] += x * M[addr_w + i * len_out : addr_w + (i + 1) * len_out]
```

```
USPROD(i2=addr_i, i1=addr_t, i0=addr_w)
#Description: Perform a sparse-matrix-sparse-vector product and add it to the accumulator
#Parameters:
#       addr_i: data memory address of the vector
#       addr_t: table memory address of the matrix
#       addr_w: data memory address of the matrix
#The vector and matrix may be located in different data memory banks.
#Math:
#       acc := acc + W * x
#       for accumulator vector acc, matrix W, and vector x
#       acc will be clipped to precision-bits after the operation
#Pseudocode:
        i = 0
        while not stop:
                (stop, col_idx, x) = M_I[addr_i + i]
                (row_addr_start, row_addr_end) = M_T[addr_t + col_idx]
                for j in range(row_addr_start, row_addr_end):
                        # read one pencil, w is a vector, P long
                        (pencil_row_idx, ws) = M_W[addr_w + j]
                        # multiply each element of ws by x
                        acc[pencil_row_idx : pencil_row_idx + P] += x * ws
                i += 1
```

METHODS AND APPARATUS FOR MATRIX AND VECTOR STORAGE AND OPERATIONS

PRIORITY

This application claims the benefit of priority to U.S. Provisional Patent Application Ser. No. 63/050,090 filed Jul. 9, 2020 and entitled "METHODS AND APPARATUS FOR LOCALIZED PROCESSING WITHIN MULTICORE NEURAL NETWORKS", which is incorporated herein by reference in its entirety.

RELATED APPLICATIONS

This application is related to U.S. patent application Ser. No. 17/367,512 filed Jul. 5, 2021 and entitled "METHODS AND APPARATUS FOR LOCALIZED PROCESSING WITHIN MULTICORE NEURAL NETWORKS", and U.S. patent application Ser. No. 17/367,521 filed Jul. 5, 2021 and entitled "METHODS AND APPARATUS FOR THREAD-BASED SCHEDULING IN MULTICORE NEURAL NETWORKS", each of which are incorporated herein by reference in its entirety.

STATEMENT REGARDING FEDERALLY SPONSORED RESEARCH OR DEVELOPMENT

This invention was made with Government support under Agreement No. N00014-19-9-0003, awarded by ONR. The Government has certain rights in the invention.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Technical Field

This disclosure relates generally to the field of neural networking. More particularly, the present disclosure is directed to hardware, software, and/or firmware implementations of neural network processing.

Description of Related Technology

Incipient research is directed to so-called "neural network" computing. Unlike traditional computer architectures, neural network processing emulates a network of connected nodes (aka neurons) that loosely model the neuro-biological functionality found in the human brain. While neural network computing is still in its infancy, such technologies already have great promise for e.g., compute rich, low power, and/or continuous processing applications.

Existing neural networks are most commonly emulated within general-purpose programming environments because commodity hardware and software compilers are well understood and readily available. Unfortunately, such implementations suffer from many inefficiencies due to e.g., hardware limitations (e.g., physical connectivity), compiler design, and/or instruction scheduling. Neural networks would be a great fit for parallel processing and distributed computing models; however, corresponding changes to hardware and compilers are needed.

SUMMARY

The present disclosure addresses the foregoing needs by disclosing, inter alfa, methods, devices, systems, and computer programs for thread-based scheduling within multicore network processors.

In one aspect, methods and apparatus for neural network processing are disclosed. One exemplary apparatus embodiment includes: processing hardware and a memory; and a non-transitory computer-readable medium comprising one or more instructions. In one exemplary embodiment, the one or more instructions are configured to, when executed by the processing hardware, cause the processing hardware to: obtain a first compressed representation of a sparse vector, the first compressed representation comprising a plurality of non-null values and at least one address offset to a next non-null value of the plurality of non-null values; obtain a second compressed representation of a second sparse data structure; calculate a plurality of intermediate element-wise products of the sparse vector and the second sparse data structure based on the at least one address offset; and calculate a result of the sparse vector and the second sparse data structure based on the plurality of intermediate element-wise products. In a related embodiment, a method to perform the foregoing techniques is described. In one exemplary embodiment, the method includes: obtaining a first compressed representation of a sparse vector, the first compressed representation comprising a plurality of non-null values and at least one address offset to a next non-null value of the plurality of non-null values; obtaining a second compressed representation of a second sparse data structure; calculating a plurality of intermediate element-wise products of the sparse vector and the second sparse data structure based on the at least one address offset; and calculating a result of the sparse vector and the second sparse data structure based on the plurality of intermediate element-wise products.

In another aspect, methods and apparatus for neural network processing are disclosed. One exemplary apparatus embodiment includes: processing hardware; a working memory; a parameter memory; and a non-transitory computer-readable medium comprising one or more instructions. In one exemplary embodiment, the one or more instructions are configured to, when executed by the processing hardware, cause the processing hardware to: obtain input from the working memory; look-up a data structure based on a column link in the parameter memory; and compute non-null results of an operation between the input and the data structure. In a related embodiment, a method to perform the foregoing techniques is described. In one exemplary embodiment, the method includes: obtaining a first representation of a vector, the first representation comprising a plurality of non-null values and at least one address offset to a next non-null value of the plurality of non-null values; obtaining a second representation of a matrix; and calculating a result of the vector and the matrix based on the at least one address offset to the next non-null value.

In another aspect, methods and apparatus for performing data structure operations are disclosed. One exemplary method embodiment includes: obtaining a first representation of a vector, the first representation comprising a plurality of non-null values and at least one address offset to a next non-null value of the plurality of non-null values; obtaining a second representation of a matrix; and calculating a result of the vector and the matrix based on the at least one address offset to the next non-null value. In a related embodiment, an apparatus to perform the foregoing techniques is described. In one exemplary embodiment, the apparatus includes: logic configured to obtain a first representation of a vector, the first representation comprising a plurality of non-null values and at least one address offset to a next non-null value of the plurality of non-null values; logic configured to obtain a second representation of a matrix; and logic configured to calculate a result of the vector and the matrix based on the at least one address offset to the next non-null value.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 1 is a graphical representation of a multicore processor architecture, commonly used within the processing arts.

FIGS. 7A and 7B are graphical representations of exemplary sparse vector and sparse matrix data structures, useful to illustrate various aspects of the present disclosure.

FIG. 9A is a pseudocode listing for performing a dense-matrix dense-vector product, in accordance with the various principles described herein.

FIG. 9B is pseudocode listing for performing a sparse-matrix sparse-vector product, in accordance with the various principles described herein.

DETAILED DESCRIPTION

Figure 2A:
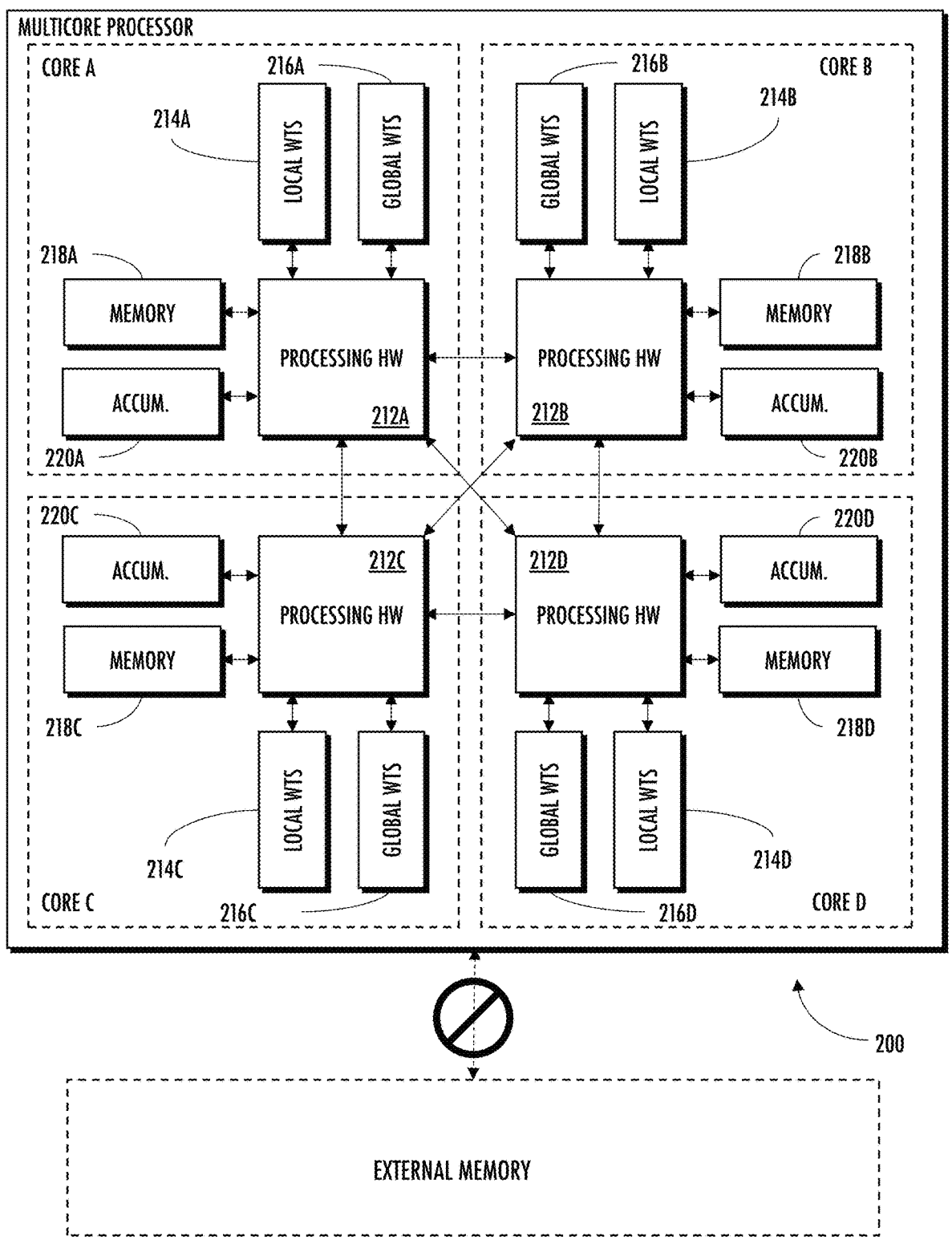
FIG. 2A is a graphical representation of one exemplary multicore architecture, in accordance with the various principles described herein.

In the following detailed description, reference is made to the accompanying drawings which form a part hereof where like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The Complexity of Software-Based Neural Networks

FIG. 1 is a graphical representation of a multicore processor architecture 100, commonly used within the processing arts. The multicore processor 102 may include one or more cores 112A, 112B . . . 112N. Each core may include logic (e.g., arithmetic logic units (ALUs), registers, etc.) arranged to perform various control and data path operations. Examples of control and data path operations may include without limitation: instruction fetch/instruction decode (IF/ID), operation execution and addressing, memory accesses, and/or data write back. A small amount of frequently used instructions and data may be locally cached "on-chip" for fast access; otherwise, "off-chip" storage provides cost-effective storage of bulk data (104A, 104B . . . 104N).

During operation, the processor cores 112A, 112B . . . 112N read and write computer instructions and/or data from the external memories 104A, 104B . . . 104N via a shared bus interface 106. Each computer instruction (also referred to as an "opcode") identifies the operation to be sequentially performed based on one or more operands (data, register locations, and/or memory addresses). By linking together sequences of computer instructions, it is possible to compute any computable sequence.

In "general-purpose" computing, the processor cores and memories may be tasked with any arbitrary task. A shared bus architecture and monolithic memory map flexibly allows every core 112A, 112B . . . 112N to access any memory location within the external memories 104A, 104B . . . 104N. As a practical matter, however, the shared bus interface 106 is physically pin-limited; there is a fixed width data bus that services all processor-memory connections one-at-a-time. Limited connectivity can significantly affect performance where multiple cores try to access the memories at the same time. Additionally, local cache sizes are limited; reading and writing to large data structures may require multiple "off-chip" transactions across the pin-limited bus.

Finally, "global" data structures cannot be accessed by more than one core at a time (simultaneous access could result in data hazards and race conditions).

Unlike general-purpose computing, so-called "neural network" computing uses biologically-inspired algorithms that take their inspiration from the human brain. Neural networks are characterized by a multi-layered composition of high-dimensional linear and non-linear functions. The intermediate function outputs between layers are known as activations. Neural networks typically contain a large number of parameters that are used for e.g., vector-matrix operations. The parameters are tuned in a gradient descent training process based on known input/output data pairings. After training, the parameters are held constant during deployment as the neural network processes novel input data to execute its trained task. For example, FIG. 1 graphically depicts one exemplary neural network computation that is performed as a vector-matrix multiplication 150. As shown therein, neural activations are modeled as a vector of digital values (a) that are multiplied by a matrix of parameter weights (B) for the neural network; the output (c) corresponds to the output neural activations.

Unfortunately, naïvely allocating neural network processing to the multicore processor architecture 100 is extremely inefficient. Firstly, each of the cores 112A, 112B, . . . 112N must access the complete set of neural network data structures. The vector and matrix dimensions are a function of the number of nodes (neurons) within the neural network, thus neural networks of any significant size exceed data sizes that can be efficiently cached on-chip. As a result, all of the cores 112A, 112B, . . . 112N constantly move data across the pin-limited bus interface 106. Additionally, each of the cores 112A, 112B, . . . 112N read and write to the same data structures (a, B, c) and often block one another.

As a related issue, "Big O" notation is used in the computer arts to classify algorithms according to computational complexity (run time and space requirements O, as a function of input size N.) Big O notation is widely used to describe the limiting behavior of a function as it increases, e.g., processing complexity, memory storage, bandwidth utilization, etc. For example, vector-matrix multiplication has a computational complexity of $O(N^2)$ for vector size (N) because each element of the vector must be multiplied by a corresponding element of each row and column of the matrix. Doubling the vector size (N) quadruples the computational complexity ($O(N^2)$).

Referring back to FIG. 1, existing neural networking solutions rely on general-purpose vector-matrix operations. Such solutions often rely on hardware accelerators to perform "brute-force" element-by-element calculation. However, the data structures that are used in neural network processing can be made to be quite sparse (a high ratio of null, or zero, values.) Brute force vector-matrix operations can be particularly inefficient for sparse data structures because the vast majority of memory reads, vector-matrix multiplications, and memory write-backs are unnecessary (null valued). Furthermore, as neural networks continue to grow in size and complexity, inefficient brute force solutions will quadratically increase in complexity.

Substantial factors in neural network energy consumption may include moving large amounts of data, and storing a large number of parameters in leaky SRAM (static random access memory). Charging and discharging wires to transfer data takes energy. Wire energy costs scale with wire length (e.g., chip area) and is a significant concern for chip design. As a related issue, neural networks are parameter-rich, but on-chip SRAM memory is costly to implement. On-chip SRAM is optimized for performance, not power consumption, so SRAM cells may consume significant amounts of energy even when idle, due to leakage. The combination of these factors can limit neural network adoption; in one specific example, remote applications are often power constrained.

Exemplary Multicore Architecture

The aforementioned complexities of neural network processing have presented significant issues for embedded device implementations. Notably, existing neural network implementations are handled within software, without regard to the underlying hardware platform limitations; unfortunately, physical connectivity (e.g., pin limitations), computational complexity, and/or scheduling overhead present significant obstacles for embedded devices. More directly, improved solutions for handling neural networks in embedded environments are needed; ideally, such solutions should enable compute rich, low power, and/or continuous processing applications.

To these ends, various principles described herein synergistically leverage locality, sparsity, and distributed scheduling, to enable neural network processing within embedded hardware applications. Unlike existing solutions that rely on commodity software and hardware to perform "brute force" large scale neural network processing; the various techniques described herein map and partition a neural network based on the hardware limitations of a target platform. The exemplary hardware-aware mapping/partitioning described herein enhances neural network performance by e.g., avoiding pin-limited memory accesses, processing data in compressed formats/skipping unnecessary operations, and distributing task scheduling while decoupling timing requirements between cores.

In one specific aspect, the globally sparse, locally dense connectivity enables data compression that can be efficiently leveraged by operational hardware to minimize unnecessary computation. Unlike existing neural network techniques that process every matrix element in memory, exemplary embodiments described herein compress sparse neural network data structures based on actual, non-null, connectivity. Processor instructions (opcodes) can de-reference the compressed data structures to directly access non-null elements for computation.

As one salient benefit, the data structures are compressed to fit within the available memory footprint and processing capabilities of a core. Fitting compressed neural network data structures for specific cores (rather than accessing an external bulk memory for all parameters en masse) reduces unnecessary data transfers into/out-of the core. Localization also reduces "wire distance" to e.g., minimize idle time, improve performance, and reduce power consumption.

Furthermore, the exemplary opcodes for sparse data structures described hereinafter can improve core processing efficiency by minimizing unnecessary computation. In this manner, very large sparse computations may be simplified by skipping most null operations. As a related benefit, sparse computations may only affect a small portion of the neural network; conceivably, this may further improve concurrency since unrelated operations may not block one another.

As a further optimization, since vectors and matrices are used differently in neural network processing, these data structures may be represented differently to further enhance performance. For example, the exemplary embodiment represents sparse matrices with links to compressed column data structures, where each compressed column data structure only stores non-null entries. The exemplary matrix data structure optimizes column-based lookups of non-null entries. Similarly, sparse vector addressing skips nulled entries. The exemplary vector data structure optimizes vector-specific non-null multiply-accumulate operations.

FIG. 2A is a graphical representation of one exemplary multicore architecture 200, in accordance with the various principles described herein. As shown, the architecture 200 does not use an external memory to store the neural network data structures nor any intermediate results. Instead, each core includes its own processing hardware (212A, 212B, 212C, 212D), local weights (214A, 214B, 214C, 214D), global weights (216A, 216B, 216C, 216D), working memory (218A, 218B, 218C, 218D), and accumulator (220A, 220B, 220C, 220D). While the following discussion is presented in the context of a core with its own dedicated memories, the techniques described herein may be used in shared memory systems and/or hybrids thereof. More generally, dedicated core resources may enable improved core performance whereas shared resources across cores may provide flexibility and/or cross-core communication opportunities.

As shown in FIG. 2A, the local neighborhood weights are stored in the local weight memories (214A, 214B, 214C, 214D) and each core's subset (or "slice") of the global network weights are stored in the global weight memories (216A, 216B, 216C, 216D). During operation, applicable weights are retrieved from the corresponding memory for computation; intermediate results may be stored within a working memory (218A, 218B, 218C, 218D) and/or accumulator (220A, 220B, 220C, 220D).

Figure 2B:
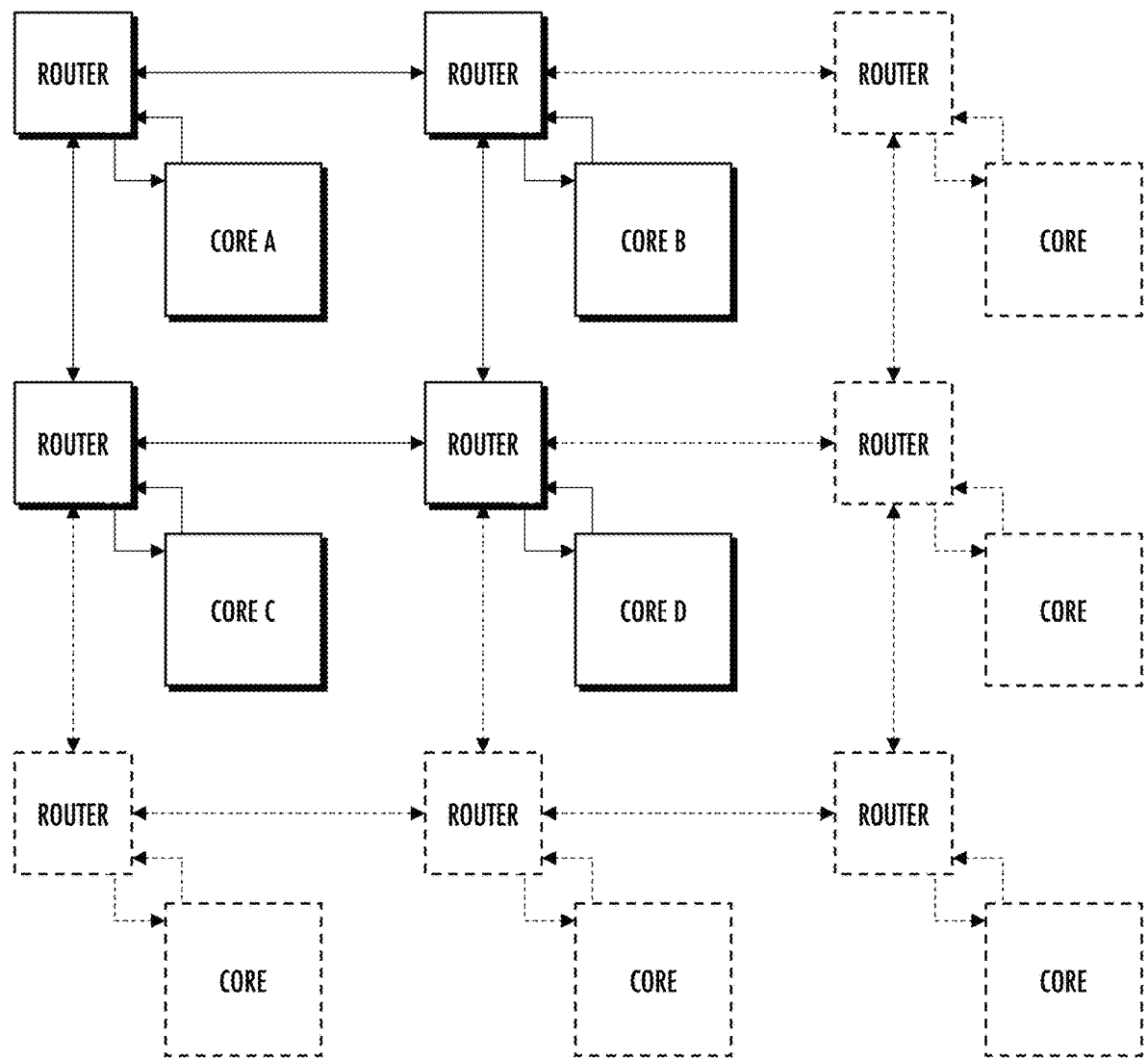
FIG. 2B is a graphical representation of the extensible nature of the multicore architecture, in accordance with the various principles described herein.

While the illustrated embodiment is shown in the context of four (4) cores emulating a global neural network of nodes, the multicore architecture described herein may be broadly extended to any number of cores and/or any number of nodes (see e.g., FIG. 2B). Additionally, the foregoing discussion presented a symmetric distribution, however asymmetric distributions may be substituted with equal success. Partitioning may be scaled to individual core's capabilities and/or application requirements. For example, asymmetric systems may enable high performance cores (more logic, memory, and/or faster clock rates) and low power cores (less logic, less memory, and/or power efficient clocking). In such implementations, matrix operations may be sized so as to complete within operational constraints, given a core's capabilities. Furthermore, any consolidation, division, distribution, agglomeration, and/or combination of processing hardware and/or memory may be substituted by artisans of ordinary skill in the related arts, given the contents of the present disclosure.

Figure 3:
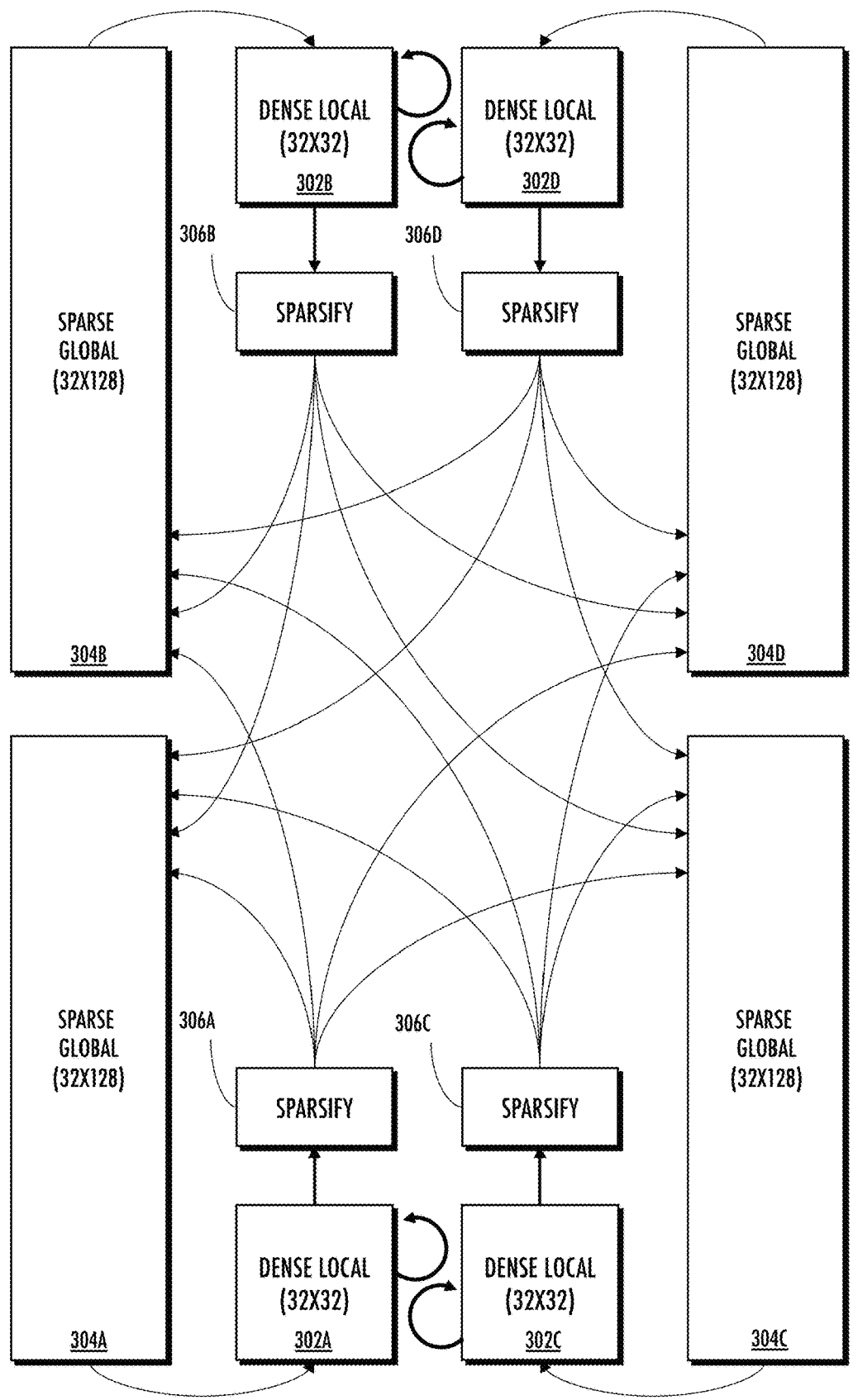
FIG. 3 is a logical block diagram illustrating the data traffic flow throughout the multicore architecture, in accordance with the principles described herein.

FIG. 3 is a logical block diagram illustrating the data traffic flow 300 throughout the multicore architecture, in accordance with the various principles described herein. Each neighborhood (302A, 302B, 302C, 302D) is characterized by a locally dense neural network. Neighborhoods are connected via a global interconnect matrix (304A, 304B, 304C, 304D) to the other neighborhoods; the output of the neighborhoods can be further sparsified prior to global distribution via interconnect logic (306A, 306B, 306C, 306D).

Unlike existing neural network processors which naively distribute processing load (discussed supra), the exemplary multicore architecture decouples processing among the cores. For example, as discussed in U.S. patent application Ser. No. 17/367,512 filed Jul. 5, 2021 and entitled "METHODS AND APPARATUS FOR LOCALIZED PROCESSING WITHIN MULTICORE NEURAL NETWORKS, previously incorporated herein by reference in its entirety, the neural network processing may be mathematically transformed (mapped) and spatially partitioned into dense "neighborhood" processing and sparse "global" communications processing. The mapping/partitioning preserves the properties of the original global neural network at a fraction of the memory accesses.

In one such embodiment, a global neural network is mapped into a set of sparsely interconnected, dense neighborhood neural networks that are partitioned based on hardware platform constraints. The transformation may be performed on a modified gated recurrent unit (GRU). Alternative implementations may perform the transformation on modified Long Short-Term Memory (LSTM) or any other "remember-forget" recurrent neural network (RNN) logic. More generally, any logic or component that retains/removes information between nodes of the neural network may be modified to transform a first domain (first vector space) to a second domain (second vector space). By avoiding data path dependencies between cores, the exemplary multicore architecture can maximize parallelism to complete tasks quickly and maximize the time spent in low-power sleep states to mitigate leakage. In one embodiment, each core is a variable-length Single-Instruction-Multiple-Data (SIMD) machine that can execute the same operation (instruction) on multiple data elements in parallel (e.g., a vector-matrix multiply or a pointwise nonlinearity on a vector). Data paths operate in parallel, so multiple instructions can execute simultaneously in a core. Likewise, cores operate in parallel, communicating only when necessary.

Additionally, the architecture may group certain elements together to accelerate certain types of computation. To benefit from such hardware-acceleration, the device-specific training may incorporate element grouping in the training process. Specifically, the training process may selectively prune elements of a parameter matrix based on a structured magnitude-based criterion. As one such example, the matrix may be broken down into subcomponents called "pencils" and pruning decisions may be made per-pencil instead of per-element. In an exemplary embodiment, a pencil is a column vector of 8 elements. For example, a matrix of shape (256, 256) would have 32 pencils per column, for a total of 8,192 pencils. The pencils with the lowest average magnitudes may be selected for pruning, until enough pencils have been pruned to reach the target sparsity level. The pencil structure may be configured to align with hardware memory interfaces—e.g., a read from memory may extract multiple consecutive elements.

In some cases, dense data operations (e.g., dense-matrix by dense-vector products) may be converted to sparse data operations (e.g., sparse matrix by sparse vector products). Matrices and vectors may be tagged as sparse or dense depending on their contents, and vector-matrix multiplication may be performed with an instruction designed for dense data or an instruction designed for sparse data (see FIGS. 9A and 9B, below). In one embodiment, sparsification occurs when either the matrix or the vector (but not both) are sparse (implementing a sparse matrix by sparse vector product where either the matrix or the vector that was originally dense may be inefficiently stored but may offer overall optimization).

Furthermore, existing neural network processing relies on a centralized task scheduler that consumes significant processing and transactional overhead to coordinate between cores. In contrast, the sparse global communications between cores of the exemplary multicore architecture decouples neighborhood processing and enables the multicore architecture to asynchronously operate the cores in parallel. Consequently, optimized variants may distribute task coordination between cores and implement asynchronous handshaking protocols between cores. For example, as discussed in U.S. Patent Application Ser. No. 17/367,521 filed Jul. 5, 2021 and entitled "METHODS AND APPARATUS FOR THREAD-BASED SCHEDULING IN MULTI-CORE NEURAL NETWORKS", previously incorporated herein by reference in its entirety, thread-level parallelism and asynchronous handshaking are leveraged to decouple core-to-core dependencies. The principles described therein enable threads to run independently of one another, without any centralized scheduling and/or resource locking (e.g., semaphore signaling, critical path execution, etc.) Decoupling thread dependencies allows cores to execute threads asynchronously. In one such implementation, the multicore architecture includes a set of distributed cores that run in parallel. The cores communicate with each other via an interconnecting network of router nodes. Each core processes its threads asynchronously with respect to the other cores. Most threads correspond to the dense neighborhood, and the core can process these threads independently of the other cores. Global communication is sparse (infrequent) and is handled via an asynchronous handshake protocol.

Exemplary Sparse Vector-Sparse Matrix Compressed Representations

As previously alluded to, existing neural network techniques naively store, and brute force process, every matrix element in memory (whether connected or not). Naïve (hardware agnostic) storage requires $O(N^2)$ memory for an N×N matrix, which is considerably more than necessary for a sparse matrix with very few actual connections. Similarly, brute force calculation quadratically increases in complexity as a function of network size (regardless of the matrix's sparsity). In contrast, one exemplary embodiment compresses, and processes sparse neural network data structures based on actual connectivity (rather than all possible connections). The implementation described herein greatly reduces storage requirements as well as computational complexity. In particular, sparse data structures that would exceed embedded device memory and/or processing constraints may be compressed so as to fit within memory footprints and/or run within performance constraints (e.g., bandwidth, real-time latency, etc.)

Figure 4:
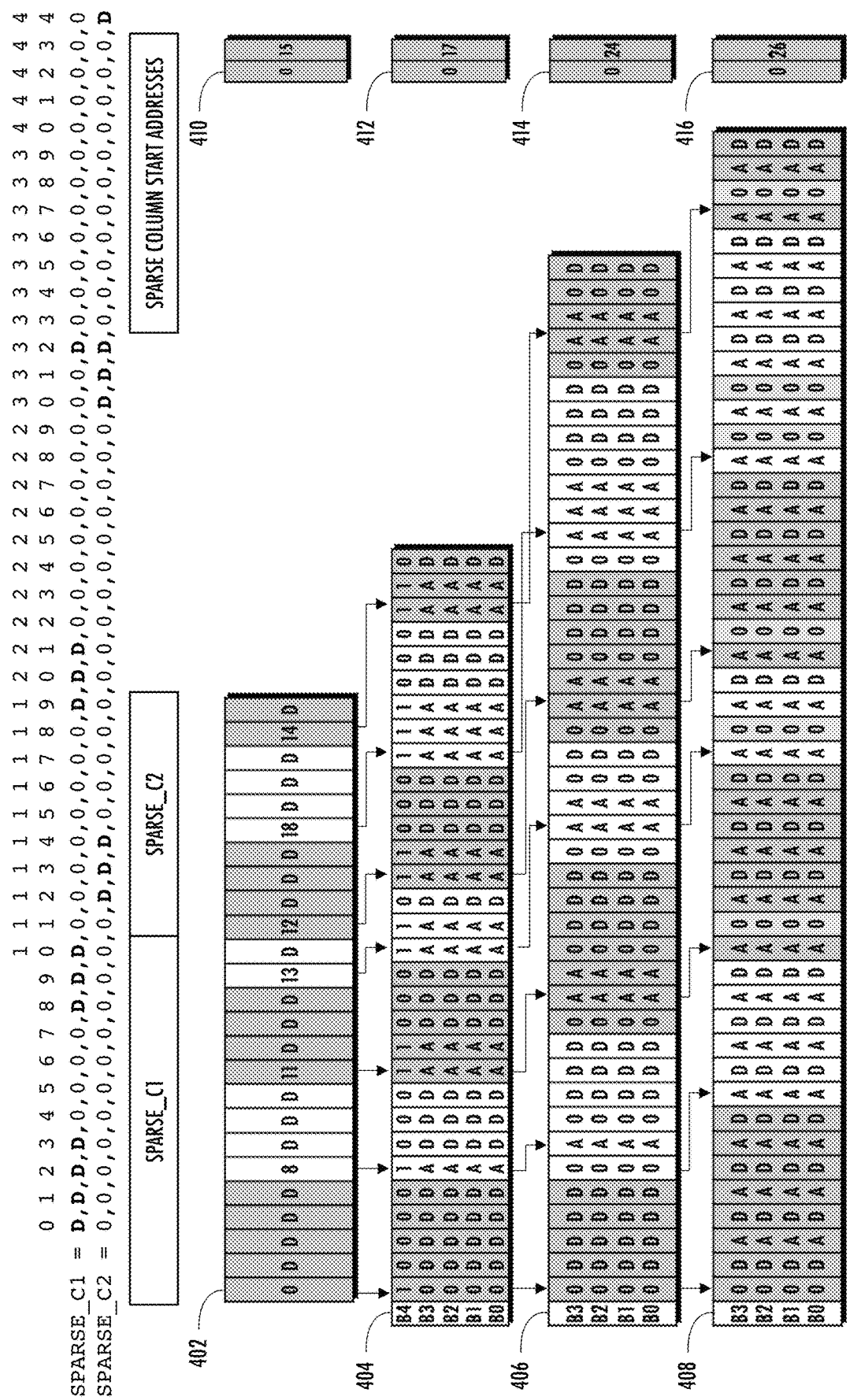
FIG. 4 is a graphical representation of different bit-wise formats for representing sparse arrays of data elements, in accordance with the various principles described herein.

Sparse data structures may be compressed into a collection of values and their corresponding position or index within a data structure. Notably, there are overhead costs associated with compression, and different techniques have different costs and benefits. Referring now to FIG. 4, a graphical illustration 400 of different bit-wise formats for representing sparse arrays of data elements is shown. A sparse vector may be represented with a one-dimensional sparse array (e.g., like either SPARSE_C1 or SPARSE_C2), whereas a sparse matrix may be represented as multiple one-dimensional sparse column arrays (e.g., a first column SPARSE_C1, a second column SPARSE_C1), with corresponding sparse column start addresses. For example, Table 402 is a 2-column matrix composed of: SPARSE_C1 with a first column offset of 0, and SPARSE_C2 with a second column offset of 15. Non-null data is denoted by a D; address offsets, where applicable, are denoted with an A.

In one exemplary embodiment, the sparse arrays group (mostly) non-zero values together in non-null consecutive sets, or "pencils" (instead of arbitrary mixtures of zero and non-zero elements). A pencil is a P×1 data structure, where P is less than the sparse array's dimension (e.g., a row/column if the matrix, the total length of a vector). The pencil data structure amortizes storage overhead of the compression scheme by grouping non-null valued data structures together. For example, a two-element pencil may be addressed with a single address rather than by addressing each element individually (reducing addressing overhead by half). As a related benefit, access locality may improve operational efficiency. Grouping parameters that are frequently accessed together within a pencil reduces access overhead. Notably, however, excessive grouping may reduce the effective dimensionality of the neural network (e.g., the complexity of node connectivity) since the parameter weights may be overly constrained in linkages, rather than being completely independent.

As a brief aside, the neural network training process may use device-specific training to incorporate element grouping in the training process. In one specific implementation, the neural network is selectively trained to maximize pencil groupings. The pencil structure size and/or distribution may be selected to align with a variety of different hardware aware considerations. For example, the neural network may be trained such that each core maximizes its access efficiency e.g., a memory read from a memory interface extracts multiple pencils. As but another example, the training may ensure that related parameters (non-null weights) are grouped together, and unrelated (or loosely related) parameters are nulled out.

As used herein, the terms "zero" and "non-zero" refer to numeric values which may be arithmetically calculated. In contrast, the term "null" refers to values that are skipped; "non-null" values are not skipped. In other words, a zero weight may be pruned to a null value or kept as a non-null value. For example, various implementations may select the value of P to optimize access locality for dimensionality, or vice versa. Larger P values reduce access overhead, while smaller P values can support higher dimensions. In one exemplary variant, pencil size may have variable length increments (e.g., two, four, eight, etc.) The variable length increments may be selected based on performance requirements; for example, six (6) non-zero parameter weights may be grouped into two pencils of length two (2) and four (4), three (3) and three (3), etc. to maximize dimensionality; alternatively, six (6) non-zero parameter weights may be represented with a single pencil of length eight (with two non-null zero values) to maximize access efficiency. In some such cases, pencil size may be parameterized within training and/or compiler preferences.

As shown in FIG. 4, different columns of a sparse matrix may vary in non-null content (e.g., SPARSE_C1 and SPARSE_C2 have a different number of non-null elements). In "fixed offset addressing" implementations, the columns may be fixed in size (e.g., according to the largest column) to reduce column addressing complexity. Such implementations may be useful where the columns are substantially similar in non-null content (e.g., trained to balance column content), where the performance loss attributed to null calculations is less than "variable length addressing", or where memory and computational complexity are flexible (e.g., time insensitive applications). In variable length addressing schemes, a parameter memory stores the start address or offset of each column (shown in tables 410, 412, 414, and 416). This scheme is more space efficient for columns that have substantial variations in non-null content, but also requires an additional step of indirection to de-reference each column's data elements. In some variants, the sparse column start addresses may be stored separately from column data (e.g., in a dedicated memory) to facilitate access.

As but one such example, consider the variable length decomposition 500 of the sparse matrix depicted within FIG.

5. As shown therein, each of the non-null entries is stored in a compressed array (val). A row_ptr array stores the first entry of each row; a col_idx array stores a corresponding column index (within the row) for each of the non-null entries. To traverse this compressed data structure to any entry (val) within the sparse matrix: start at the top left of the matrix; go row_ptr entries from left to right. Wrap to the next row down upon reaching the end of the current row; and go col_idx entries further. For example, to de-reference the value at $A_{5,6}$, the 5th index of row_ptr is 12 (row 5), the $2^{nd}$ value indicates that column 6 ($5^{th}$ index) has an associated value; therefore, the $14^{th}$ location of val stores the de-referenced value 5.0. Notably, this scheme immediately identifies the presence of a null position; e.g., de-referencing $A_{5,1}$ returns a null value (the first non-null value in row 5 is the $4^{th}$ index ($5^{th}$ position)).

Referring back to FIG. 4, three different bit-wise formats are presented: a first format that uses an extra bit (B4) to distinguish data from address offsets (table 404), a second format that uses all-0 data-address offset separators (table 406), and a third format that uses data-address offset pairs with all-0 separators (table 408). In some embodiments sparse vectors and sparse matrices use the same compression scheme. For example, both sparse vectors and sparse matrices may be represented using the compression scheme illustrated in table 408 (and sparse column start address table 416). In other embodiments, different compression schemes are used for sparse vectors and sparse matrices. For example, sparse vectors may be represented using the compression scheme illustrated in table 404 while sparse matrices may be represented using the compression scheme illustrated in table 406 (and sparse column start address table 414).

Selection of the bit-wise storage format for sparse vectors and matrices may be based on hardware requirements (e.g., size of the ALU, addressing capacity) and/or based on the data (e.g., patterns in the data itself, such as clustering of non-null data, may lend itself to more efficient storage using different compression schemes). In some embodiments, the core processors may use different compression schemes to accommodate different degrees of sparsity, more/less frequent access, and/or access latency/throughput. In some variants, the core processors may support multiple different functionalities with different instruction sets; the selection of the appropriate format (and corresponding instructions) may be based on the training process. For example, a sparse matrix that prefers immediate access to data/address may perform well with the first format 404 since the extra flag bit (B4) is retrieved at the same time as data and address. In other cases, large pencils of data may be better served with format 406 since a single address can be used for multiple data entries. Still other implementations that are less well grouped may prefer format 408 since each data has a corresponding address.

Table 402 is a logical representation of a 2-column matrix where the first column (offset 0) includes four (4) pencils at relative column offsets of 0, 8, 11, and 13 (SPARSE_C1); the second column (SPARSE_C2) has three (3) pencils at relative column offsets of 12, 18, and 14. For example, Table 402 starts with a 0, which indicates that the first value (at location 0) in SPARSE_C1 is a data value. The second group of data values is at word 8 (which is 8 more than 0), then word 19 (which is 11 more than 8), and then word 32 (which is 13 more than 19). As sparse column start address table 410 indicates, the SPARSE_C2 column begins at the $15^{th}$ position of the larger combined data structure. In SPARSE_C2, the first data value is at word 12, the second group of data values is at word 30 (which is 18 more than 12), and the last is at word 44 (which is 14 more than 30).

Table 404 illustrates a first compression scheme that uses an additional bit (B4) to indicate whether the value represented by bits [B0:B3] is a data entry (D, flagged by a 0) or address offset entry (A, flagged by a 1). A corresponding sparse column start address table 412 indicates that SPARSE_C1 column begins at position 0 and SPARSE_C2 column begins at position 17 of the data structure. In this implementation, each word in table 404 has 5 bits, however in other embodiments words may be larger (e.g., 9 bits for an 8-bit pencil, 17 bits for a 16-bit pencil) or smaller (e.g., 3 bits for a 2-bit pencil). Alternative implementations may e.g., reverse the flag meaning (addresses use 0, data uses 1) or otherwise modify the position of the flag (e.g., in the LSB rather than the MSB), etc. Still other implementations may combine multiple consecutive address offset entries to represent offsets larger than 15 (the largest value represented by 4 unsigned bits when zero is included); consecutive entries could be summed or have their bits concatenated to represent the larger offset. In such variants, a value of B4:B0 of 10000 (or similar flag) may also be used to indicate the start of a new column for the parameter memory. The total memory requirement of this scheme may be calculated based on EQNS. 1-5:

$$Tot.Dat.\text{Bits} = D \times (B_d + 1) \qquad \text{EQN. 1}$$

$$Tot.Addr.\text{Bits} = A \times \left(B_a + \frac{B_a}{B_d}\right) \qquad \text{EQN. 2}$$

$$Tot.OvrHd.\text{Bits} = N \times (B_d + 1) \qquad \text{EQN. 3}$$

$$Tot.Mem = N \times (Tot.Dat.\text{Bits} + Tot.Addr.\text{Bits} + Tot.OverHd.\text{Bits}) \qquad \text{EQN. 4}$$

$$Tot.Mem.\text{Row} = N \times B_r \qquad \text{EQN. 5}$$

Where:
$B_d$ represents the number of bits for each data entry;
$B_a$ represents the maximum number of bits required to represent one address offset for a sparse column vector;
$B_r$ represents the maximum number of bits required to represent each row starting address depending the size of the columns;
D represents the number of non-null data values in a sparse matrix or sparse vector;
A represents the number of address offsets; and
N represents, for a parameter matrix, the number of rows or columns or for an activation vector, the length.

Table 406 illustrates a second compression scheme that uses all-zero data address offset separators. In this scheme, data and address fields may alternate with the all-zero separator. In the illustrated embodiment, address fields follow data fields, however, in other embodiments, the data fields follow address fields. In this implementation, the sparse column start address table 414 indicates that the SPARSE_C1 column begins at position 0 and SPARSE_C2 column begins at position 24 of the larger combined data structure (reflecting the increase in words/pencils). In one such implementation, starting with the same type of entry (e.g., an all zero delimiter, or a data entry) allows the hardware to treat every column the same; e.g., the hardware does not need logic to check whether the first entry is a delimiter or data. Other implementations may use hardware logic to robustly determine the column entry types (e.g., this may be useful where data may be malformed, etc.) The total memory requirement of this scheme may be calculated from EQNS. 6-10:

$$\text{Tot. Dat. Bits} = D \times B_d \quad \text{EQN. 6:}$$

$$\text{Tot. Addr. Bits} = A \times (B_a + (2 \times B_d)) \quad \text{EQN. 7:}$$

$$\text{Tot. OvrHd. Bits} = N \times (2 \times B_d) \quad \text{EQN. 8:}$$

$$\text{Tot. Mem} = N \times (\text{Tot. Dat. Bits} + \text{Tot. Addr. Bits} + \text{Tot. OvrHd. Bits}) \quad \text{EQN. 9:}$$

$$\text{Tot. Mem. Row} = N \times B_r \quad \text{EQN. 10:}$$

Table 408 illustrates a third compression scheme that alternates between data and address offset entries. If an offset is larger than representable by a single address offset entry (one word), then an all-zero entry indicates that the next entry is also an address offset. The first word (that is not all-zeros) is data and the second word is an address (unless the escape word of all zeros is used). In one embodiment, the first non-null entry offset may be relative to the top left of the matrix, however one of ordinary skill would understand that such an offset may be relative to any corner or portion of the matrix. In another embodiment, another data "window size" is (pre-)selected and 2, 3, 4, etc. data entries may be followed by an address unless escaped. Sparse column start address table 416 indicates that the SPARSE_C1 column begins at position 0 and SPARSE_C2 column begins at position 26 of the larger combined data structure (reflecting the increase due to all-zero words/pencils). The total memory requirement of this scheme may be calculated from EQNS. 11-14:

$$\text{Tot. Dat. Bits} = D \times B_d \quad \text{EQN. 11}$$

$$\text{Tot. Addr. Bits} = D \times B_d \quad \text{EQN. 12}$$

$$\text{Tot. Mem} = N \times (\text{Tot. Dat. Bits} + \text{Tot. Addr. Bits} + \Delta) \quad \text{EQN. 13}$$

$$\text{Tot. Mem. Row} = N \times B_r \quad \text{EQN. 14}$$

Where Δ is a function of the matrix's sparsity and is the additional number of data and address bits needed to satisfy the address offset bit width constraint.

As previously alluded to, the vectors and matrices are used differently in neural network processing. While the foregoing discussion has focused the different overhead costs and benefits associated with compression, the exemplary data structures may also be leveraged to enhance instruction execution. For example, the exemplary sparse matrices described herein include links to compressed column data structures, where each compressed column data structure stores mostly non-null entries (large runs of null entries are skipped). Similarly, the exemplary sparse vector addressing schemes described below skip most nulled entries. Conceptually, the skipped entries represent operations that may also be skipped (rather than computing a null result); the following discussions describe non-null multiply-accumulate operations that synergistically leverage the sparse data structures described above.

Exemplary Sparse Vector-Sparse Matrix Multiply Operations

Existing techniques for neural network processing are based on element-wise vector-matrix operations. For example, if A is an M×N matrix with column vectors $C_1, C_2, \ldots C_N$ of size 1×M and X is an N×1 column vector with entries $x_1, x_2, \ldots, x_n$, then the product of x by A is given by EQN. 15:

$$Ax = [C_1 \ C_2 \ \ldots \ C_N]\begin{bmatrix} x_1 \\ x_2 \\ \vdots \\ x_N \end{bmatrix} = x_1 C_1 + x_2 C_2 + \ldots + x_N C_N \quad \text{EQN. 15}$$

In practical implementation, this vector-matrix multiplication results in M×N element-wise multiplications i.e., each term of each column vectors $C_{1-N}$ is multiplied by a term of the column vector X.

Instead of performing element-wise operations, exemplary processing logic of the present disclosure skips (rather than computes) null operations. In other words, the sparse data structure operations only read/write non-null values that will affect the resulting output (e.g., the state of the neural network). As but one such example, if $x_3 = 0$ in a vector then $x_3 w_{m,3} = 0$ for any row m in column 3 of the parameter matrix; thus, the core may skip reading column 3 from memory, and skip the corresponding multiplications to perform the vector-matrix multiplication more efficiently. The hardware may also skip operations involving zeros in the parameter vectors (columns of the parameter matrix). For example, if $w_{3,1} = w_{4,1} = 0$ and $x_1 w_{3,1} = x_1 w_{4,1} = 0$. The hardware may neither store those values nor perform the multiplications.

Figure 6:
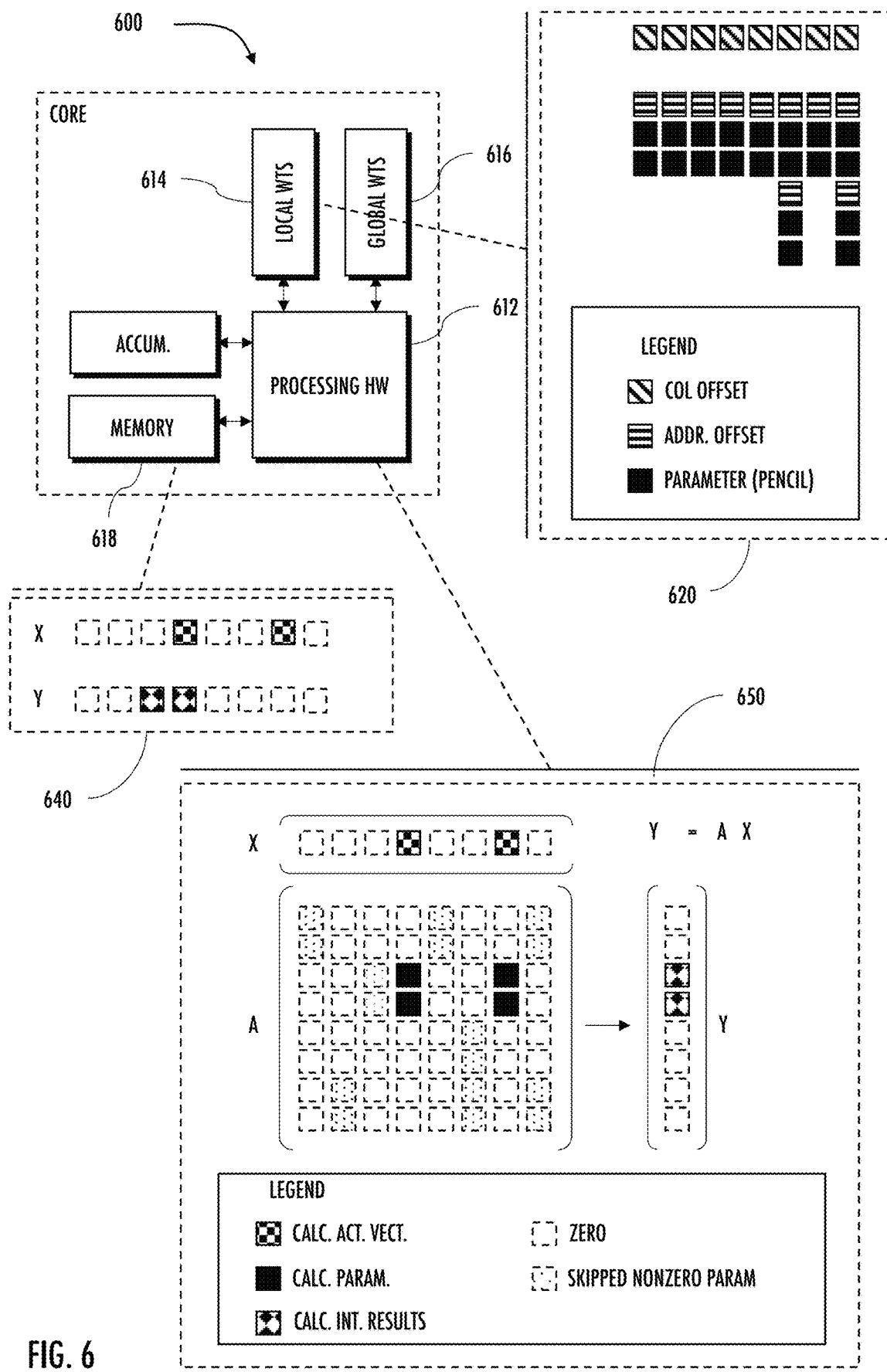
FIG. 6 is a graphical representation of one core and memory subsystem of the exemplary multicore architecture, useful to illustrate aspects of the present disclosure.

FIG. 6 is a graphical representation of one core and memory subsystem 600 of the exemplary multicore architecture useful to illustrate various aspects of the present disclosure. As shown therein, the core includes processing hardware 612 that is tightly coupled to: (i) a memory 614 that stores its local, dense neighborhood of weights (ii) a memory 616 that stores the core's portion of the sparse, global weights, and (iii) a working memory 618. Register-based operation may be slightly faster than memory-based operation, whereas memory-based operation may offer more flexibility addressing. Additionally, registers can be inexpensively manufactured to different degrees of precision (e.g., representing more bits) than entries in memory banks; this may be particularly useful for storing intermediate results. Thus, in some variants, the working memory 618 stores input and output vectors (x, y) for an operation, and an accumulator stores intermediate results of the operation within a vector register. In other variants, the memory 618 stores input, output, and intermediate result vectors. Still other memory/register variations may be substituted with equal success by artisans of ordinary skill in the related arts, given the contents of the present disclosure.

In one embodiment, the neighborhood weights are stored according to the aforementioned all-0 data-address offset separator format (see e.g., Table 408 of FIG. 4); a graphical illustration of the compressed storage is provided in breakout 620. As shown therein, the sparse matrix representation provides a substantially more compact representation than storing the entire matrix (N×N). Specifically, the sparse matrix only requires O(M) complexity (where M is the non-null elements plus offset overhead). For example, a matrix that is only 10% non-null values may be compressed to nearly a tenth of the size (assuming negligible offset overhead).

As a further optimization, the working memory (breakout 640) provides ready access to the subset of compressed vector data that is needed for the computation. As is illustrated in FIG. 6, the sparse vector and sparse matrix data structures are not decompressed for computation. In other words, the data formats described above facilitate lookups based on parameter validity/invalidity and element-wise computation of valid parameters.

Since sparse vectors and matrices have many nulls, the exemplary implementation efficiently accesses only non-null values that may affect the final output (breakout 650). In other words, a null value in either the activation vector or the parameter can be skipped. In the exemplary embodiment, the core skips null operations based on the activation vector positions (null value positions). For example, if the first three entries of the activation vector are null, then the first three parameters of any column may be skipped. Additionally, for each non-null activation vector entry, the core only performs element-wise operations where there are corresponding pencil data structures (e.g., non-null parameter data). In the illustrated example, only the 4th and 7th column have a pencil data structure that corresponds to the 4th position. Consequently, only two (2) intermediate results need to be calculated.

FIGS. 7A and 7B provide graphical representations 700 and 750 of exemplary sparse vector and sparse matrix data structures. Sparse vector $X_N$ is represented as a one-dimensional listing of data entries. Each entry of the sparse vector may use one (1) bit to indicate whether the four (4) bit value is data or an address offset (see e.g., Table 404 of FIG. 4 above). Multiple consecutive address offset entries can be used to represent larger offsets. In some cases, an all-zero address offset may be treated as a separator code to indicate the start of a new column. As shown, sparse vector $X_N$ may be represented in a vector expanded representation 702 which may be converted to, or be originally represented in, a vector compressed representation 704.

Sparse matrices, such as sparse matrix W N,N, may be represented with two (2) separate data structures: a one-dimensional column offset array 706 to facilitate column-based lookups, and a one-dimensional parameter array (expanded in a two-dimensional representation 708). The parameter array stores non-null parameters as "pencils" of the matrix; each pencil includes several non-null parameters (the pencil dimension is two (2) elements in FIGS. 7A and 7B, however higher order dimensions may be substituted with equal success). Note, the one-dimensional column offset array 706 shows rows with 3 elements for ease of reading individual pencils. Zeros may be inserted if the number of valid entries is less than the pencil size. Each index of the column offset array 706 identifies the first pencil of the column using an offset. Furthermore, an all-zero pencil may be treated as a separator code to indicate boundaries between data and address offsets (as valid pencils have at least one non-zero parameter).

FIG. 7B illustrates the sparse parameter matrix $W_{N,N}$ in an expanded representation 710. Matrix $W_{N,N}$ is size N×C and sparse vector $X_N$ is N elements long, where N is 12 and C is 6. A compressed representation 712 of Matrix $W_{N,N}$ using a pencil size of 2 is shown for reference. The output calculations 714 of a multiplication between the sparse parameter matrix $W_{N,N}$ and the sparse vector $X_N$ are shown for reference. As depicted therein, only non-null multiplications (between a non-null vector value and a non-null matrix value) are performed. The null operations are skipped; the operands are not read from memory nor are any intermediate values calculated or stored in temporary memory. The output of each of output calculations may be bundled/stored into a vector $Y_{1,N}$ 716.

Figure 8:
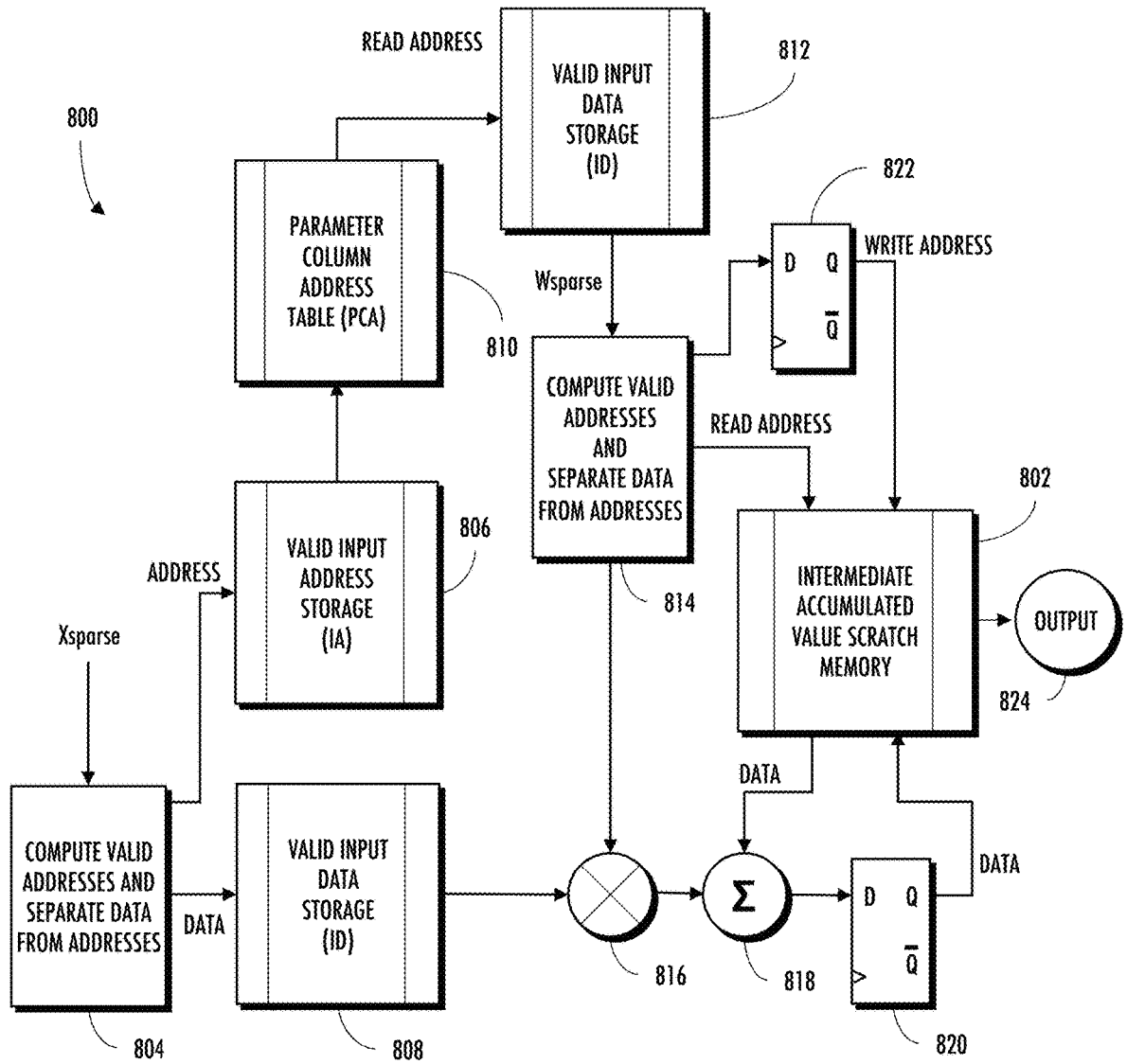
FIG. 8 is a data flow diagram of an exemplary sparse vector-sparse matrix operation, in accordance with the various principles described herein.

Referring now to FIG. 8, a data flow diagram of an exemplary sparse vector-sparse matrix operation 800 is shown. The exemplary sparse vector-sparse matrix operation 800 may be performed by one or more cores of the exemplary multicore architecture 200 of FIG. 2. Furthermore, while the techniques are described with respect to multicore architecture 200, artisans of ordinary skill in the related arts given the contents of the present disclosure will readily appreciate that the techniques described herein may be adapted for use with the exemplary multicore architecture 100 of FIG. 1 with equal success. For example, hardware structures may be present in exemplary multicore architecture 200 to efficiently perform the following instructions which may be performed by, or emulated in, the exemplary multicore architecture 100. Additionally, while discussed in the context of a neural network implementation, the described data structures, operations, and configurations may also be useful in a variety of other contexts involving matrix and/or vector operations.

Prior to operation, the system memory may be reset to known values, e.g., scratch memory locations storing any intermediate accumulated values ($H_{ACC}$) 802 may be initialized to zero. Additionally, any neural network state will be set to a known value. Thereafter, neural network states may be retained and accumulated until reset again.

At step 804 of the method 800, a sparse input vector ($X_{sparse}$) may be separated into input addresses and input data. In some variants, this step may also determine whether an address contains valid (non-null) data; null computations may be skipped without execution.

In one exemplary embodiment, the sparse input vector ($X_{sparse}$) may be directly processed (without decompression) in its compressed format. The compressed format may have some or all zero values replaced with null values. Reference data structures may be used to preserve the spatial relationships of non-null elements within the input vector. Reference data structures may include, without limitation: address offsets from the beginning/end or other reference point of the data structure, address offsets from the previous non-null/null element, address offsets from the previous address offset, absolute addresses in memory of the next non-null/null element. Addresses may be distinguished from data by a flag. The flag may be a single bit or a full word before the data/address offset.

The input addresses of valid (non-null) input data entries are stored within a first-in-first-out (FIFO) buffer 806. A second FIFO buffer 808 may be used to store valid (non-null) input data. The FIFO buffer(s) may be sized according to bandwidth and/or processing speed considerations of the system. The buffer may be of a fixed size or dynamically sized based on the number of total elements, non-null elements, or null elements in the vector.

At step 810 of the method 800, for each valid (non-null) input address (from the vector $X_{sparse}$) B, the multicore architecture 200 reads a parameter column address (PCA) table for the corresponding parameter column address in the parameter memory. The parameter column address (PCA) table may include column start addresses for each of the columns of the matrix. The column start addresses in the PCA table may be absolute or relative. Relative addressing may be relative to the previous column or the beginning of the matrix, or other fixed location.

At step 812 of the method 800, the compressed parameter column (Wsparse) of the matrix is read from parameter memory. The compressed parameter column may include valid (non-null) parameter data and associated address offsets. While the present discussion is presented in the context of column-based addressing, row-based addressing may be substituted with equal success by artisans of ordinary skill given the contents of the present disclosure.

The compressed parameter column (Wsparse) of the matrix may include "pencil" data structures. In one such embodiment, each pencil includes a plurality of adjacent matrix elements, at least one of which may be non-zero. The pencil may be addressed using either an absolute address in parameter memory, or a relative address within the column. In an embodiment where the address is a relative address, the address may be an offset from the beginning of the column or an offset from the previous pencil structure. Parameters in a sparse parameter matrix may be pruned and optimized through neural network training to meet the particular memory and performance metrics of multicore architecture 200.

At step 814, the compressed parameter column (Wsparse) is read from the parameter memory and valid (non-null) data and addresses are decoded. The input addresses of valid (non-null) input data entries are stored within a first temporary memory (e.g., a register/latch 822).

Notably, both steps 810 and 814 leverage the aforementioned compressed data structures of the vector (in step 810) and matrix (in step 814) to look-up only valid non-null entries or pencils (thereby skipping null portions of the sparse data structures). More directly, the exemplary data structures do not contain null elements; thus, null elements are implicitly skipped (e.g., the pencil structure only contains non-null, mostly non-zero content). In other embodiments, the native data structures may be additionally checked to determine whether the immediate operation includes non-null values (prior to access/calculation); such variants may be useful where software emulation or hardware implementation does not provide the compressed representations described above.

For each of the valid data and addresses, the valid data is fed through the multiplier 816 to compute the products of the valid parameters and the input vector entries are calculated according to EQN. 16, via the adder 818:

$$H_C = H_C + x_B W_{C,B}$$ EQN. 16

Where:
$H_C$ represents the intermediate accumulated values of $H_{ACC}$ at the valid non-null index C;
$x_B$ represents the valid non-null element of the input compressed input vector (Xsparse) at index B; and
$W_{C,B}$ represents the valid non-null element of the parameter memory according to the corresponding indexes column B, row C.

In one embodiment, this product may include an element-wise product of only the non-null elements of the sparse vector (the pencil) and the corresponding non-null elements of the sparse matrix. Empirically, the processing complexity for the exemplary pencil operations is only a fraction of non-null components ($O(\alpha\beta N^2)$). For an assumed sparsity of ~10% for activation vectors ($\alpha$) and parameters ($\beta$), the reduction is a 100× compared to brute force $O(N^2)$.

During operation, the intermediate results $H_C$ may then be written back to scratch memory at the address C (after temporary storage in register/latch 820). This process is repeated for all valid non-null operations (e.g., where both the sparse vector and the sparse matrix have valid non-null entries). While the present disclosure is directed to compressed-compressed operation, artisans of ordinary skill in the related arts given the contents of the present disclosure will readily appreciate that the techniques described herein may be adapted to either only compressed vector, or only compressed matrix analogs. In other words, the improvement in processing does not require both data structures to be compressed; a compressed vector or compressed matrix in isolation will still skip some unnecessary calculations.

At the conclusion of the operation, the accumulator results may be output from scratch memory (at step 824). The output of the vector-matrix multiplication is a vector of the same size as a column vector of the sparse matrix (W). Intermediate results are stored in scratch memory until the completion of all the intermediate multiplications and additions performed. The resulting output may be stored in memory, transmitted to other cores, and/or used as an input vector for another operation within the same core.

The memory address offset is specific to the activation vector data structure; thus, multiply-accumulate operations can be performed using direct addressing operands (e.g., read-modify-write) to the physical memory address offset. Since the activation vector only modifies its own memory entry, other entries in the memory are not touched and continue to reflect their last known state. In other words, the neural network's state does not need to be recalculated with every activation vector; the direct addressing scheme ensures that the memory updates only the affected nodes of the network.

The concepts described herein may be broadly extended to any data structure size, whether fixed or variable, sparse or dense. As used in the present context, the term "sparse" and "sparsity" refer to a dimensional distribution that skips elements of and/or adds null elements to a set. While the present disclosure is primarily directed to sparsity in spatial dimensions, artisans of ordinary skill in the related arts will readily appreciate that other schemes for adding sparsity may be substituted with equivalent success. A variety of other data structures may be used for representing sparse data structures, the aforementioned data structures being purely illustrative.

FIGS. 9A and 9B are pseudocode listings 900 and 950 for exemplary vector and matrix product operations. FIG. 9A is a pseudocode listing 900 for an exemplary non-sparse (or dense) vector and matrix product. FIG. 9B is a pseudocode listing 950 for an exemplary sparse-vector sparse-matrix product. Neither algorithm is limited to sparse/dense calculations. In other words, it is appreciated that there are operational costs and benefits to the aforementioned compression of sparse data structures. In some cases, the computational benefits may outweigh de-referencing costs and/or other memory overhead, or vice versa. In some cases, an instruction set may include instructions and data types for both sparse and dense representations of vectors and matrices.

In FIG. 9A, pseudocode listing 900 shows a method of performing a dense-matrix dense-vector product and adding the result to the accumulator. Inputs to the function include len_out (the length of the output vector and height of the matrix); addr_i (the address of the vector); len_in (the input vector length and width of the matrix); and addr_w (the address of the matrix). A dense vector type may include one or more elements of one or more precisions (e.g., standard 8 bit (un)signed precision, double 16 bit (un)signed precision, etc.). A standard array may be substituted for a dense vector with equal success. A dense matrix may include two data elements: one or more elements of one or more precisions (e.g., a 4-bit (un)signed value, an 8-bit (un)signed value, etc.) and data that represents the dimensions of the matrix (i.e., the number of rows and columns). A standard multi-dimensional array may be substituted for a dense matrix with equal success. In pseudocode listing 900, a loop iterates through the elements of a vector and for each element and computes the vector-matrix product column by column.

In FIG. 9B, pseudocode listing 950 shows a method of performing a sparse-matrix sparse-vector product and adding the result to the accumulator. Inputs to the function include addr_i (the address of the vector in data memory); addr_t (the address of the matrix in table memory), addr_w (the address of the matrix in data memory). In pseudocode listing 950, a loop iterates though the vector elements until it reaches the end of the vector. The code then retrieves variables for the vector entry (column index and value). Another (inner) loop iterates through the pencils in the matrix and retrieves the start and ending address of a column in the matrix. For each pencil, each element is multiplied by the applicable vector value and added to the result in the accumulator vector.

Methods

Figure 10:
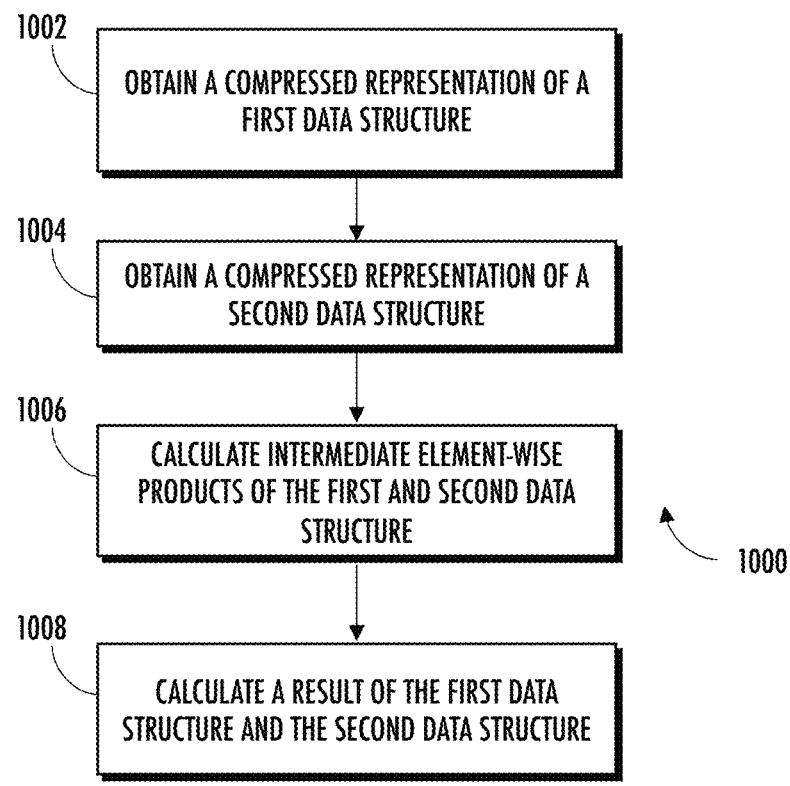
FIG. 10 is a logical flow diagram of an exemplary method for performing data-structure operations, in accordance with the various principles described herein.

Referring to FIG. 10, a logical flow diagram of an exemplary method 1000 for performing data structure operations is shown.

At step 1002 of the method 1000, a compressed representation of a first data structure is obtained. In one embodiment the first data structure is a vector. A vector is a single dimensional data structure that may include multiple elements.

In one exemplary embodiment, a core may obtain an input vector from the working memory. The input vector may include a compressed representation of a sparse vector. The input vector may be an activation vector, which may include the output of a (hidden) layer of a plurality of nodes of a neural network that is used as an input into nodes of the next layer of the neural network. This input vector may include data from a plurality of cores of a multicore architecture (e.g., a global activation vector) or from a single core (e.g., a neighborhood activation vector). The input vector may be a dense or sparse vector. In contrast, the compressed format may include only non-null values. To preserve data placement within the representation, address offsets or reference links to the non-null elements may be included.

In other embodiments, elements within the vector may be stored contiguously as in a primitive array. Furthermore, in some implementations (particularly in dynamic data structures or for very large data structures) elements of the vector may be stored in disparate memory locations but linked together logically (through, e.g., pointers).

In some embodiments, the first data structure and/or its compressed representation may be stored in the same memory; in other embodiments, data and/or variables may be allocated to different types/kinds of memory. The memory may include persistent storage and/or non-persistent storage. In other embodiments, different types of data may be stored differently. For example, vector input, address and data FIFO buffers, the parameter column address table, the parameter memory, and intermediate values may all be stored in the same or different structures and different kinds of structures that may be accessed separately and/or in parallel.

In some cases, the first data structure and/or its associated compressed representation may be stored so as to optimize data traffic flow. Examples of traffic optimizations may include e.g. pipelining and/or parallelizing (e.g., SIMD) vector-matrix operations. For example, non-blocking operations may be performed in parallel. As another example, resource contention may limit overall access rates, e.g., there may be memory access bottlenecks when multiple processes attempt to read/write from the same place. Non-contentious access (e.g., dedicated resources and/or multi-port access) may minimize idle time for shared memory accesses. In some cases, separate memories may be used for different functional aspects of operation. For example, sparse vector and/or sparse matrix multiplications may utilize distinct parameter memory, parameter column address table memory, scratch memory, accumulator/temporary (register/latch) memory, FIFO buffer memory. In other embodiments, some, or all of these may be subsumed within a shared memory.

In one embodiment, the compressed representation may exploit patterns in the underlying data elements of the first data structure. For example, a sparse vector with many zero elements may be compressed into an array of linked non-null values (e.g., pencils). In some variants, the compressed data structure may be mostly non-zero (some zero entries may be retained to preserve desirable padding, etc.) In other variants, the compressed data structure is only non-zero content.

In one embodiment, address offsets may be used within the compressed representation to indicate "skips"/nulls in the data. More broadly, any reference data may be substituted with equal success; as used herein, reference data is an indirect link to a value (the "referred to" value). Reference data is "de-referenced" to retrieve the value. Reference data may include absolute or relative addressing, offsets, indexing, and/or any number of other linking scheme. In other words, reference data may be used to refer to the next non-null element of the data structure so as to skip unnecessary elements (nulls).

Figure 5:
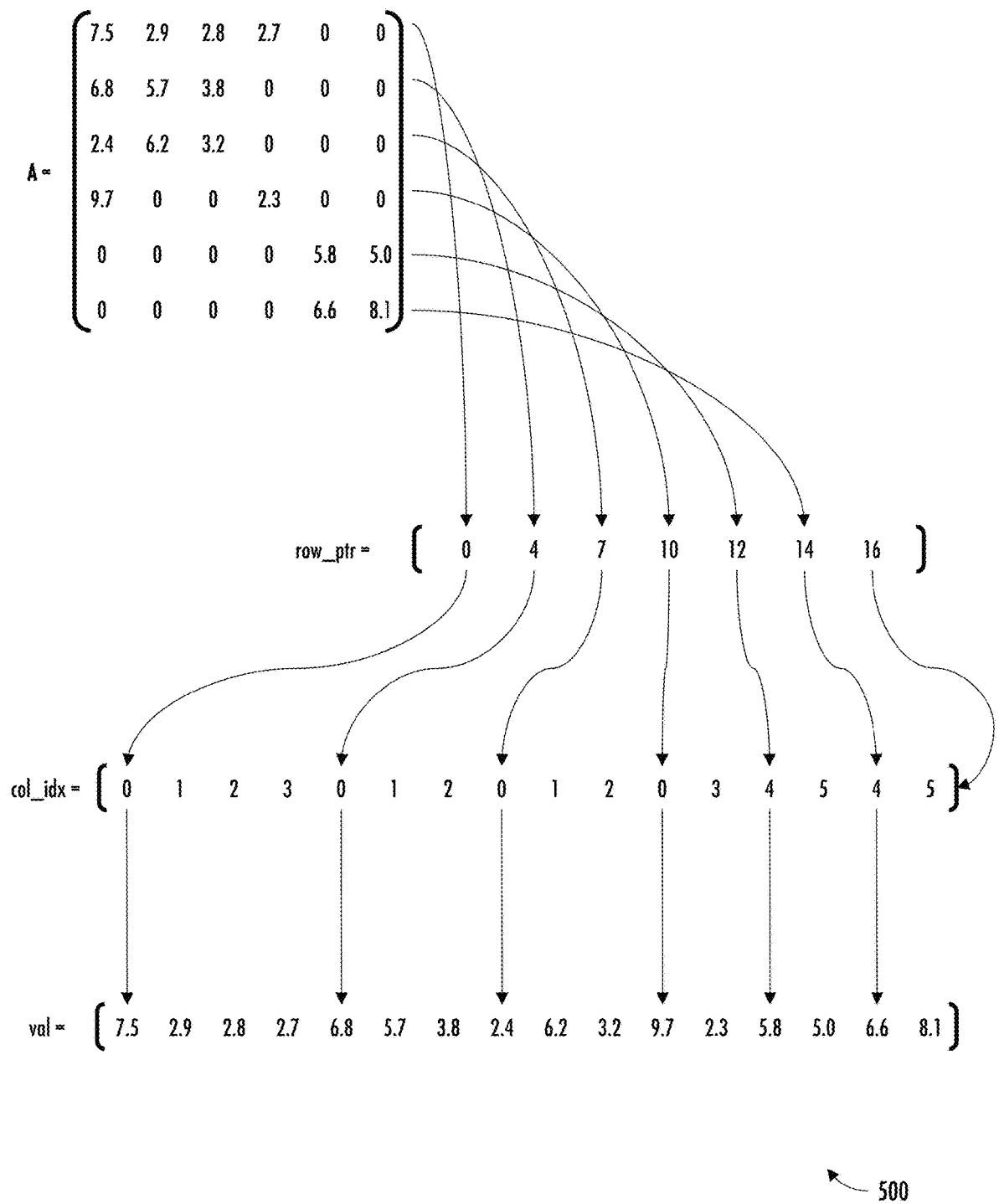
FIG. 5 is a graphical representation of a variable length decomposition of an exemplary sparse matrix, in accordance with the various principles described herein.

While the present disclosure is described in the context of references to non-null elements, other implementations may use reference data structures to identify null elements. Explicitly flagging nulls (instead of non-nulls) may be used to emulate skipping behavior (particularly in applications where the overhead used by such techniques is less than the original vector representation). While a variety of illustrative schemes have been described (see e.g., FIGS. 4 and 5 above), artisans of ordinary skill given the contents of the present disclosure will readily appreciate that a myriad of other techniques could be substituted with equal success.

In one example, the compressed representation of the first data structure may be made up of a plurality of words of data. Each word may include one or more control bits and a plurality of value bits. One of the control bits may indicate that the value bits comprise a non-null value or a number of null values. In another example, one of the control bits may indicate that the value bits comprise an address offset. In another embodiment, separate control words may be flags or delimiters to indicate that the next portion of data (the next word, or the next set of words until the next delimiter) is a type of data (data or address/a number of null values). In another embodiment, certain combinations of reserved words may have control meaning; for example, two all-zeros (or all ones) words may indicate the end of the first data structure.

While the foregoing discussion is presented in the context of a sparse vector, the concepts described herein may be broadly extended to any data structure, whether fixed or variable, sparse or dense. As a brief aside, the sparsity/density of a data structure may be calculated by dividing the number of non-zero/non-null/non-empty elements to the total number of elements. For example, a sparse vector or matrix may have a sparsity of 0.1 (only 10% of the values are non-zero) whereas a dense vector or matrix may have a density of 0.9 (90% of the values are non-zero). Sparsity and density may be terms of absolute or relative degree. A data structure may be considered sparse if most of its values (greater than 50%) are zero or null values; similarly, a first data structure may be sparser than a second data structure even where both data structures are dense (i.e., mostly non-zero). While any data structure may be considered relatively sparse or dense, there may be propagation/storage efficiencies as the data becomes sparser and/or computational efficiencies to packing data more densely.

Another consideration for the compressed representation of the first data structure is the overhead cost of data manipulations. As but one example, the exemplary additional steps to de-reference address offsets can greatly improve operation for very sparse vectors; however, more dense data structures may not benefit much, and in some cases may actually suffer from excessive de-referencing. More broadly however, the quadratic growth of existing brute force vector-matrix operations is such that even extremely sparse data structures may benefit more from compression and de-compression prior to computation; in other words, even non-computable compressed representations may provide tangible benefits over very large data structures.

While the present disclosure describes operational overhead in terms of referencing and de-referencing address offsets, other types of operational overhead may be included and/or substituted with equal success. Examples of such overhead may include compression/de-compression, encryption/decryption, encoding/decoding, authentication, authorization, and/or any other form of conditioning prior to data manipulation. In some cases, external metadata may be used to simplify access, or parse the underlying data. For example, certain operations may use metadata to identify the presence of, type, and/or conditions for e.g., compression, encryption, encoding, etc.

The compressed representation of the first data structure may be obtained either from memory storage or the output of a previous process. For example, a neural network or a layer/node of a neural network may output a vector after performing one or more operations. The output vector may be used by other layers/nodes as input for further calculation (in both forward and back propagation).

At step 1004 of the method 1000, a compressed representation of a second data structure may be obtained. In some embodiments, the second data structure comprises a matrix. A matrix is a rectangular or two-dimensional data structure that may include multiple elements arranged in rows and columns. In some examples, a matrix may include data in a single-dimensional structure with metadata (another data structure) that includes the rectangular (width and/or length) dimension(s) of the structure. In other embodiments, a matrix may include higher-dimensional elements (3, 4, 5, etc. dimensions) which may be reduced down to a vector of matrices/vectors of matrices/vectors. In some embodiments, a matrix may be an array/vector of row/column vectors.

In one exemplary embodiment, a sparse matrix may be compressed into a data structure that includes e.g., an array of row and/or column pointers, where each row/column may include "pencil"-like data structures. A separate data structure (and in some examples in a separate memory) may be used to define start addresses for each of the column/row vectors and may be used to access individual elements or pencils in the matrix. For example, a parameter column address table may be used to determine the address of columns within a matrix stored in parameter memory.

In one exemplary embodiment, a core may look-up a subset of the second data structure. For example, for each valid (non-zero) input address of a vector, a core may read a parameter column address (PCA) table for the corresponding parameter column addressing information. The non-null elements of the compressed parameter column are retrieved from the parameter memory based on the address(es) retrieved from the PCA table.

More broadly, while the various techniques are described in the context of dimensional data structures e.g., a 1D vector and a 2D matrix, the techniques may be treated as a number of non-null element-wise operations on a pair of one-dimensional arrays (the compressed vector, and each compressed column of the matrix). Virtually any higher-order data structure may be decomposed into the aforementioned operations. As but one such example, a three-dimensional array can be decomposed into a set of two-dimensional matrices, each of which may then be decomposed into a set of one-dimensional arrays. In other words, the techniques described herein are broadly applicable to any number of higher-order operations (e.g., topologies of three, four, five, etc. dimensions)

In some implementations, the second data structure may be subdivided into one or more spatial components. For example, a sparse matrix may contain sets of global or local parameters/weights corresponding to different slices of a neural network. These parameters correspond to localized computations for each node of the multicore architecture; this enables different cores to provide spatially separate processing. In these examples, the matrix may be obtained from parameter memory and/or a parameter column address table.

Pencils may include data structures within a column (or row) of a vector or matrix. Consecutive non-null elements may be grouped together in a standard (or variable sized) grouping with an address/address offset to describe the position in the vector or column/row of a matrix. In a sparse vector or matrix, this grouped data type may allow for unnecessary operations (e.g., null operations) to be skipped. In some embodiments, the number of consecutive elements may be 2, 3, 4, or more. In some embodiments, the number of consecutive elements is fixed, but the fixed size may be selected based on operating metrics. Such metrics may include the size of the vector/matrix or the length of columns of the matrix, how clumped or interspersed non-zero/zero data is compared to non-null/null data, how sparse the data is, and/or the size requirements of hardware (e.g., the arithmetic logic unit), the instruction set, or addressing/offset sizes. Elements within a pencil structure may be stored contiguously as in a primitive array (a sub-array of the full vector). Addresses may be relative from the beginning of the column (3 pencil positions into the column) or an offset from previous "pencils" (e.g., 2 pencil positions from the previous pencil). In some examples, an empty pencil may be used to indicate that a column/row is empty.

At step 1006 of the method 1000, a plurality of intermediate element-wise products of the first data structure and the second sparse data structure are calculated. In one exemplary embodiment, the intermediate element-wise operation may correspond to the non-null element-wise products of a sparse vector and sparse matrix (or, e.g., a matrix and matrix and vector and vector, etc.)

When performing multiplication on sparse data structures, many intermediate multiplications as well as data read-modify-write operations may be performed that result in a zero value because one of the operands are zero. Some, or all, of these unnecessary multiplications may be "skipped" by replacing a zero-result operand with a null value. Using data structures that do not include null values, the system can perform fewer of these zero-result intermediate multiplications. Additionally, the values of the operands would not have to be checked. By only computing (or computing fewer) non-zero results, fewer read, write, and modify operations may be performed.

In one embodiment, intermediate values may be retrieved by traversing the compressed representations for the non-null values and associated positional information (e.g., address offsets, etc.) The non-null values and the positional information may be stored in a first-in first-out (FIFO) data structure. In another embodiment, the non-null values and plurality of addresses are stored in separate data structures. The addresses associated with the plurality of non-null values may be based on the locations within the vector or matrix (in expanded representation) rather than in the compressed representation.

In one specific implementation, a core may read a parameter column address table associated with the sparse matrix for each non-null element of the sparse vector. The core may obtain a corresponding non-null value of the matrix, at the corresponding parameter column address. In one specific case, the core may decode a non-null "pencil" data structure. In one specific implementation, the pencil data structure is mostly non-zero; in some cases, the pencil may be all non-zero values.

More broadly, various embodiments of the present disclosure perform the element-wise operation by de-referencing the compressed representations to reduce unnecessary operations. In one specific implementation, a core may skip to the non-null elements of the vector/matrix to reduce memory accesses. In some cases, the core may also skip null operations when at least one operand is a null value to reduce computations. In other embodiments, null and/or non-null elements may be identified based on flags, control words, or other reference data type. Other mechanisms may be substituted with equal success by one of ordinary skill given the contents of the present disclosure.

While the present discussion is presented in the context of vector-matrix multiplication, the techniques described herein may be broadly applied to a variety of other operations. Examples of such operations may include addition/subtraction, division, inversion, transposition, and/or any number of matrix-matrix operations (dot product, cross product) or manipulations (transposes, inversions). The operations of method 1000 may be performed by one or more cores of the exemplary multicore architecture 200 of FIG. 2. The various concepts described herein may be extended to any application that performs sparse vector/matrix operations or compressed operations generally. Artisans of ordinary skill in the related art, given the contents of the present disclosure will readily appreciate that less optimal "partially sparse" hardware or software implementations may reduce the efficiencies presented herein. Partially sparse implementations, however, may be preferable where exemplary implementations are infeasible and/or unnecessary, or where the only alternative is naïve brute force processing (such as via the multicore architecture 100 of FIG. 1). Even though overall device performance may suffer, partial performance improvements may be preferred in view of other holistic system constraints (e.g., convenience, breadth of deployment, versatility, code/network re-use, etc.)

At step 1008 of the method 1000, the result of the first data structure and the second data structure may be calculated. In some embodiments, both data structures are dense data structures, and an algorithm may be used to more efficiently process dense data (see e.g., FIG. 9A). In other embodiments, both data structures are sparse data structures, and a different algorithm may be used to more efficiently process sparse data structures (see e.g., FIG. 9B). In further embodiments, a hybrid algorithm may be used or one of the previous algorithms selected where only one of the data structures is sparse. For example, it may be more efficient to use a sparse algorithm for a sparse vector-dense matrix because the sparsity of the vector may reduce some multiplication/addition operations.

These intermediate results may be summed and stored in an accumulator for an output vector at the completion of all intermediate multiplication and summations. The accumulator may include a vector-like data structure with as many elements as the matrix data structure as rows. The summation of an intermediate results and storage location in the accumulator may be to a vector position that corresponds to the row of the matrix.

The results of the first data structure and the second data structure may be retrieved from the accumulator following the multiplication and summation of each of the individual elements of the first data structure and the second data structure.

In some embodiments, the calculated result (the output vector) of the multiplication, may be a dense vector. In other embodiments, the output vector may be a sparse vector. Accordingly, the system may compress the sparse vector into a sparse vector format.

While the foregoing descriptions are provided in the context of artificial neural networks within embedded devices, the principles described herein are not limited to such applications. The concepts described herein may be extended to any compressed data structure operations that may benefit from more efficient processing and storage techniques. As but a few such examples, vector or matrix compression and manipulation may be used in statistical analysis software, cryptography, and/or computer graphics processing. A plurality of cores may perform the steps of method 1000 in parallel as the different individual sub-operations (multiplications and additions, as illustrated) may be performed in parallel with memory and task coordination.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A neural network processing apparatus, comprising:
   processing hardware and a memory; and
   a non-transitory computer-readable medium comprising one or more instructions which when executed by the processing hardware, causes the processing hardware to:
   generate a first compressed representation of a sparse vector the first compressed representation comprising a plurality of non-null values and at least one address offset to a next non-null value of the plurality of non-null values;

obtain a second compressed representation of a second sparse data structure, the second compressed representation comprises a plurality of non-null data structures, each of the plurality of non-null data structures comprising a same number of values, the same number is greater than one;

determine the plurality of non-null values and a plurality of addresses associated with the plurality of non-null values from the first compressed representation;

for each non-null address of the plurality of addresses of the first compressed representation:
read a parameter column address table for a corresponding parameter column address;
read a parameter column from a parameter memory of the second sparse data structure at the corresponding parameter column address;
decode non-null data and addresses from the parameter column; and
for each of the non-null data and the addresses compute a product of the non-null data and a corresponding non-null value of the plurality of non-null values to calculate a plurality of intermediate element-wise products of the sparse vector and the second sparse data structure; and
calculate a result of the sparse vector and the second sparse data structure based on the plurality of intermediate element-wise products.

2. The neural network processing apparatus of claim 1, where:
the first compressed representation comprises a plurality of words of data, and
each word of the plurality of words of data comprises a control bit and a plurality of value bits, the control bit indicating that the plurality of value bits comprise a non-null value or the at least one address offset.

3. The neural network processing apparatus of claim 1, where the second sparse data structure exceeds a parameter memory dimension associated with the memory of the neural network processing apparatus; and
where the second compressed representation fits within the parameter memory dimension.

4. The neural network processing apparatus of claim 1, where the second sparse data structure comprises a sparse matrix.

5. The neural network processing apparatus of claim 4, where the second compressed representation comprises a pointer to a compressed column of the sparse matrix, where the compressed column comprises one or more non-null data structures of the plurality of non-null data structures.

6. The neural network processing apparatus of claim 5, where the compressed column of the sparse matrix does not include null values.

7. The neural network processing apparatus of claim 6, where a memory address of the compressed column comprises a base address and an offset.

8. The neural network processing apparatus of claim 1, where the second sparse data structure comprises a plurality of columns characterized by a fixed size and where each column of the plurality of columns is identified by a column offset.

9. The neural network processing apparatus of claim 1, where at least one dimension of the first compressed representation of the sparse vector is selected based on access efficiency.

10. The neural network processing apparatus of claim 1, where at least one dimension of the first compressed representation of the sparse vector is selected based on neural network training.

11. The neural network processing apparatus of claim 1, where at least one non-null data structure of the plurality of non-null data structures comprises a zero value.

12. A neural network processing apparatus, comprising:
processing hardware;
a working memory;
a parameter memory; and
a non-transitory computer-readable medium comprising one or more instructions which when executed by the processing hardware, causes the processing hardware to:
generate a first compressed representation of a sparse vector the first compressed representation comprising a plurality of words of data, each word of the plurality of words of data comprises a control bit and a plurality of value bits, the control bit indicating that the plurality of value bits comprise a non-null value or at least one address offset to a next non-null value;
obtain a second compressed representation of a second sparse data structure; and
for each non-null address of the first compressed representation:
read a parameter column address table for a corresponding parameter column address;
read a parameter column from the parameter memory of the second sparse data structure at the corresponding parameter column address;
decode non-null data and addresses from the parameter column; and
for each of the non-null data and the addresses compute a product of the non-null data and a corresponding non-null value of the plurality of words of data.

13. The neural network processing apparatus of claim 12, where the one or more instructions further cause the processing hardware to accumulate non-null results in the working memory.

14. The neural network processing apparatus of claim 13, where the working memory stores a last known state of a plurality of intermediate results and where unrelated operations can access the working memory concurrently.

15. The neural network processing apparatus of claim 13, where the second sparse data structure comprises a sparse matrix and the non-null results are a plurality of intermediate results of element-wise multiplications between non-null elements of the sparse vector and the sparse matrix.

16. A method of performing a matrix operation, comprising:
generating a first representation of a vector, the first representation comprising a plurality of words of data, each word of the plurality of words of data comprises a control bit and a plurality of value bits, the control bit indicating that the plurality of value bits comprise a non-null value or at least one address offset to a next non-null value;
obtaining a second representation of a matrix; and
for each non-null address of the first representation:
reading a parameter column address table for a corresponding parameter column address;

reading a parameter column from a parameter memory of the second representation of the matrix at the corresponding parameter column address;

decoding non-null data and addresses from the parameter column; and for each of the non-null data and the addresses computing a product of the non-null data and a corresponding non-null value of the plurality of words of data.

17. The method of claim 16, where the second representation comprises a plurality of consecutive non-null elements of the matrix.

18. The method of claim 16, further comprising calculating a result of the vector and the matrix based on the product for each of the non-null data and the addresses, where the result comprises a sparse global vector for a global neural network state of a multicore neural network.

19. The method of claim 16, further comprising calculating a result of the vector and the matrix based on the product for each of the non-null data and the addresses, where the result comprises a dense local vector for a local neural network state of a core of a multicore neural network.

* * * * *